US011202439B2

(12) United States Patent
Gribble et al.

(10) Patent No.: US 11,202,439 B2
(45) Date of Patent: Dec. 21, 2021

(54) EVAPORATIVE COOLING SYSTEM FOR AN ANIMAL BARN

(71) Applicant: Five-G Consulting Inc., Reno, TX (US)

(72) Inventors: Ted A. Gribble, Reno, TX (US); Donald L. Gribble, Reno, TX (US)

(73) Assignee: Five-G Consulting Inc., Reno, TX (US)

( * ) Notice: Subject to any disclaimer, the term of this patent is extended or adjusted under 35 U.S.C. 154(b) by 237 days.

(21) Appl. No.: 16/198,647

(22) Filed: Nov. 21, 2018

(65) Prior Publication Data

US 2019/0261593 A1    Aug. 29, 2019

Related U.S. Application Data

(60) Provisional application No. 62/590,103, filed on Nov. 22, 2017.

(51) Int. Cl.
*A01K 1/00*    (2006.01)

(52) U.S. Cl.
CPC .......... *A01K 1/0052* (2013.01); *A01K 1/0082* (2013.01); *A01K 1/007* (2013.01); *A01K 1/0058* (2013.01)

(58) Field of Classification Search
CPC .... A01K 1/007; A01K 1/0047; A01K 1/0052; A01K 1/0058; A01K 1/0064; A01K 1/0082; F28D 5/00
USPC ........................................................ 119/448
See application file for complete search history.

(56) References Cited

U.S. PATENT DOCUMENTS

| | | | | |
|---|---|---|---|---|
| 2,450,571 A | * | 10/1948 | Bahnson, Jr. .............. | F24F 3/14 454/337 |
| 3,223,070 A | | 12/1965 | Gribble et al. | |
| 4,083,149 A | * | 4/1978 | Hickman ............... | A01K 1/007 49/147 |

(Continued)

FOREIGN PATENT DOCUMENTS

| | | | | |
|---|---|---|---|---|
| CN | 93207686 U | * | 3/1993 | .............. E06B 9/28 |
| CN | 106765755 A | | 5/2017 | |

(Continued)

OTHER PUBLICATIONS

U.S. Receiving Office, International Preliminary Report on Patentability in International Patent Application No. PCT/US2018/062338, dated May 26, 2020, 12 pages.

(Continued)

*Primary Examiner* — Ebony E Evans
(74) *Attorney, Agent, or Firm* — Kolisch Hartwell, P.C.

(57) ABSTRACT

A structure for sheltering and cooling livestock may include a concrete floored barn having an improved evaporative cooling system. The cooling system may include a misting stack having air inlets, a mixing chamber, and three cooling zones wherein the cooling zones correspond to three different temperature ranges. Each of the cooling zones may include a plurality of nozzles which produce a mist. As air passes through the mixing chamber, the mist may evaporate and cool the air. The cooling system may further include a plurality of large exhaust fans located at an end of the barn distal from the misting stack. The fans may draw the cool air through the barn, over and around the livestock, and out of the barn.

33 Claims, 21 Drawing Sheets

(56) References Cited

U.S. PATENT DOCUMENTS

| | | |
|---|---|---|
| 4,443,387 A | 4/1984 | Gordon |
| 4,476,809 A | 10/1984 | Bunger |
| 4,693,852 A | 9/1987 | Gordon |
| 4,737,103 A * | 4/1988 | Siccardi ............... A01G 9/246 432/222 |
| 5,136,980 A * | 8/1992 | Schoeber ............. A01K 1/0047 119/448 |
| 5,146,762 A | 9/1992 | Atkins |
| 5,492,082 A | 2/1996 | Krevinghaus et al. |
| 5,620,015 A | 4/1997 | Gribble et al. |
| 5,643,082 A * | 7/1997 | Furukawa ............ F24F 1/0007 454/337 |
| 5,813,599 A * | 9/1998 | Hoff ..................... A01K 1/0047 236/49.3 |
| 5,924,922 A | 7/1999 | Eakin et al. |
| 6,014,948 A | 1/2000 | Gordon |
| 6,073,586 A | 6/2000 | Medlin et al. |
| 6,079,365 A | 6/2000 | Medlin et al. |
| 6,086,053 A | 7/2000 | Natschke et al. |
| 6,129,285 A | 10/2000 | Schafka |
| 6,293,121 B1 | 9/2001 | Labrador |
| 6,409,157 B1 | 6/2002 | Lundin et al. |
| 6,578,828 B2 | 6/2003 | Terrell et al. |
| 6,675,739 B2 | 1/2004 | Terrell et al. |
| 6,705,599 B2 | 3/2004 | Terrell et al. |
| 6,883,251 B2 | 4/2005 | Terrell et al. |
| 7,158,863 B1 * | 1/2007 | Johnson ................ A47F 3/0447 62/256 |
| 7,547,364 B2 | 6/2009 | Polak |
| 7,743,620 B1 | 6/2010 | Severson |
| 8,181,604 B1 * | 5/2012 | Avila .................... A01K 1/0052 119/448 |
| 8,397,677 B2 | 3/2013 | Bruer et al. |
| 8,585,361 B1 | 11/2013 | Terrell |
| 8,974,274 B2 * | 3/2015 | Carlson ................ F24F 5/0035 454/184 |
| 2008/0308253 A1 * | 12/2008 | Knape, Jr. ............ F24F 1/0059 165/47 |
| 2009/0211272 A1 * | 8/2009 | Larsen .................. F28D 5/00 62/89 |
| 2009/0314216 A1 | 12/2009 | Polak |
| 2011/0168105 A1 | 7/2011 | Bain |
| 2011/0214615 A1 * | 9/2011 | Martin .................. E04B 7/16 119/448 |
| 2012/0055414 A1 * | 3/2012 | Correa ................. A01K 1/0029 119/448 |
| 2014/0057548 A1 | 2/2014 | Lemmon et al. |
| 2021/0045347 A1 * | 2/2021 | Roscam Abbing .. A01K 1/0047 |

FOREIGN PATENT DOCUMENTS

| | | |
|---|---|---|
| KR | 100795362 B1 | 1/2008 |
| WO | 8607438 A1 | 12/1986 |

OTHER PUBLICATIONS

Evaporative Cooling Systems: How and Why They Work, The Poultry Site, published May 22, 2013, 6 pages.
Mist Articles, Mist Cooling Evaporative Coolers, retrieved from the Internet on Jul. 29, 2017, 5 pages.
U.S. Receiving Office, International Search Report in International Patent Application No. PCT/US18/62338, dated Feb. 19, 2019, 30 pages.
U.S. Receiving Office, Written Opinion of the International Searching Authority in International Patent Application No. PCT/US18/62338, dated Feb. 19, 2019, 11 pages.

* cited by examiner

EVAPORATIVE COOLING SYSTEM FOR AN ANIMAL BARN

CROSS-REFERENCE TO RELATED APPLICATION

This application claims priority to U.S. Provisional Patent Application Ser. No. 62/590,103, entitled Animal Barn with Evaporative Cooling System, filed on Nov. 22, 2017, the entirety of which is hereby incorporated by reference for all purposes.

FIELD OF THE DISCLOSURE

This disclosure relates to systems and methods for cooling livestock. More specifically, the disclosed embodiments relate to an improved structure for sheltering livestock and methods for cooling the air within that structure, thus cooling the animals.

BACKGROUND OF THE DISCLOSURE

The present disclosure relates to systems and structures for maintaining a healthy and productive environment for livestock, such as dairy or beef cows or swine. This can include providing shelter for livestock and controlling the temperature of the air within that shelter to cool the livestock.

In many parts of the world, daily temperatures can rise to 100 degrees or more for significant portions of the year. Such high temperatures can have a negative impact on the health of the livestock and, in extreme conditions, there is a risk of livestock dying from heat exposure. Even in more moderate heat, the productivity of livestock such as cattle can be negatively impacted.

For at least these reasons, a number of mechanisms for keeping livestock cool have been developed. Some methods include cooling the animal directly. For example, it is a well-known method in the art to wet livestock to cool them through manual or natural evaporation. Some methods include cooling the resting environment, such as cooling the air within the enclosure used for resting and feeding. Optimizing environmental comfort for the livestock, such as by keeping the livestock cool during hot weather, can improve the health of the group and increase productivity. Cooling livestock can also help prevent the loss of livestock during extreme weather.

Issues with methods of cooling livestock directly that include wetting the animals or the use of mist may include excessive wetting of the animals or bedding. Wet bedding can be very detrimental to livestock health and sanitation; for example, wet bedding may result in the growth of pathogens. Continuously wet livestock potentially risks fungus or other pathogens being in contact with the livestock.

Examples of systems for cooling livestock are disclosed in U.S. Pat. Nos. 4,443,387, 4,476,809, 4,693,852, 6,014,948, 6,079,365, 6,086,053, 6,293,121, 6,409,157, 6,578,828, 6,675,739, 6,705,599, 6,883,251, 7,547,364, 8,397,677, and 8,585,361. Examples of other equipment for use with livestock is disclosed in U.S. Pat. Nos. 3,223,070 and 5,620,015. The disclosures of these and all other publications referenced herein are incorporated by reference in their entirety for all purposes.

SUMMARY OF THE DISCLOSURE

The structure according to the present teachings maintains a healthy and productive environment for livestock, such as dairy cows, by evaporatively cooling air within the structure and thus cooling the livestock. Benefits of this structure may include healthier and more productive livestock as well as a lower likelihood of loss of livestock due to heat exposure. Moreover, by cooling the air itself instead of the livestock, this structure and related methods avoids the issues associated with continuously wet livestock and/or bedding.

The present disclosure provides systems, apparatuses, and methods relating to a structure (in some examples, an animal barn) with an improved evaporative cooling system. In some embodiments, a structure with an evaporative cooling system may include a misting stack at one end of the structure and a plurality of exhaust fans at the other end of the structure. In some embodiments, a structure with an evaporative cooling system may include a restricted opening for air inflow which may reduce the impact of changes in external conditions such as pressure or wind direction. In some embodiments, a structure with evaporative cooling systems may include a plurality of misting nozzles located in three evaporation zones in the misting stack wherein the misting nozzles are configured to produce a mist which cools incoming air through natural evaporation. In some embodiments, a structure with evaporative cooling systems may include separate feed truck lanes wherein a series of baffles and/or doors may be used to separate the air flow of the feed truck lanes (where cooling is unnecessary) from the air flow of the rest of the barn.

The present disclosure provides methods and systems for an evaporative cooling system that may be installed to a structure configured to hold livestock. Such structure may include a first end, a second end opposite the first end, and two sides opposite one another, with the two sides extending between the first end and the second end. Such structure may further include a roof above the ends and sides, and wherein the ends, sides, and roof may include therewithin at least one region for the livestock. The system may be configured to provide an airflow to the structure for cooling the livestock and exchanging air with the region for the livestock. The system may include an evaporation zone configured to be positioned adjacent the first end of the structure. The evaporation zone may include a wall configured to separate in part the evaporation zone from the first end of the structure. The evaporation zone may further include an opening adjacent the wall, and the opening may be configured to allow the airflow to pass from the evaporation zone into the region for livestock in the structure. The system may further include at least one exhaust fan configured to be positioned adjacent the second end of the structure with an inlet side facing the region for the livestock. The exhaust fan may be further configured to draw the airflow through the structure to the inlet side and out through the exhaust fan.

In one or more embodiments, the system may include a misting stack with the evaporation zone in the misting stack. The misting stack may be in a chamber formed in part by the wall that partly separates the evaporation zone from the first end of the structure. The chamber may be formed by three walls in addition to the wall configured to separate in part the evaporation zone from the first end of the structure. The chamber may include a roof and one or more air inlets adjacent the roof.

In some embodiments, the evaporation zone may include one or more inlet divider baffles in the chamber adjacent one of the air inlets. The inlet divider baffle may be configurable to reduce the airflow through the adjacent air inlet. The system may provide airflow with a speed of at least about 1500 feet per minute through the at least one air inlet. The chamber may provide for the airflow to include a portion passing downward through the evaporation zone toward the opening adjacent the wall.

In one or more embodiments, the height of the misting stack may be selected for the system to provide for an air retention time of about 2.5 seconds, which may minimize the amount of mist reaching ground and animal beds. The system may provide the airflow with a speed of at least about 550 feet per minute through the evaporation zone. The system may provide the airflow with a speed of at least about 9 miles per hour through the region for the livestock. The system may provide the airflow with a controlled speed in the range from about 9 miles per hour to about 11 miles per hour through the region for the livestock.

In some embodiments, the opening adjacent the wall may be located below the wall. The system may be used with a structure that includes at least one region not for the livestock, and at least one baffle may be provided in the structure to redirect the airflow away from the region not for the livestock.

In some embodiments, the evaporation zone may include a high pressure misting zone and a low pressure misting zone. Either or both of the high pressure misting zone and the low pressure misting zone may be selectively operable to accommodate varying environmental conditions. The exhaust fan may be operable to vary the airflow.

In one or more embodiments, the system may include at least one sail configured to be deployed in the region for the livestock and the sail may be operable to direct the airflow toward the livestock. The system may include at least one curtain configured to be deployed along at least one side of the structure. The curtain may be configured to be rolled up and may be translucent. The system may include at least one piece of insulation configured to be installed in the roof of the structure.

In some embodiments, the system may include a plurality of exhaust fans and at least one exhaust fan may be located on the second end of the structure and at least one exhaust fan may be located on each of the sides of the structure. The system may also include at least one soaker nozzle assembly configured to be located in the region for the livestock.

In one or more embodiments, the system may include a control system coupled to the soaker nozzle assembly and operable to cycle the soaker nozzle assembly through on times and off times, for example, an on time in a range from at least about 1 minute to no more than about 3 minutes and an off time in a range from at least about 10 minutes to no more than about 15 minutes. The system may include a control system coupled to the evaporation zone and the exhaust fan and operable to adjust the evaporation zone and the exhaust fan for a desired air exchange within the region for the livestock in the structure. The system may provide airflow within the region for the livestock in the structure sufficiently to completely exchange the air within about 45 seconds.

Features, functions, and advantages may be achieved independently in various embodiments of the present disclosure, or may be combined in yet other embodiments, further details of which can be seen with reference to the following description and drawings. Advantages of the present disclosure will be more readily understood after considering the drawings and the Detailed Description.

DETAILED DESCRIPTION OF THE DISCLOSURE

Figure 1:
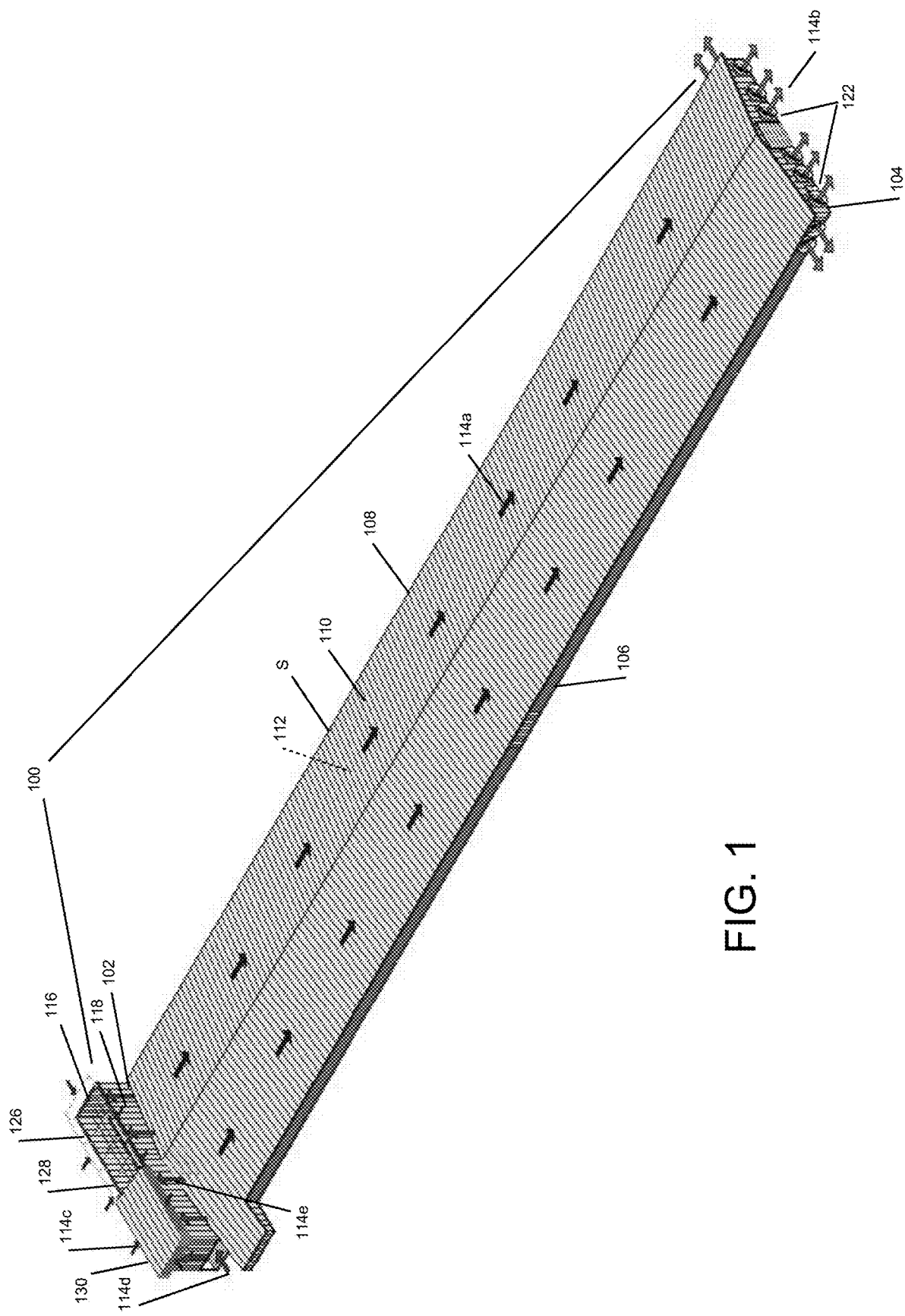
FIG. 1 is a top perspective drawing of a barn for holding cows having a plurality of fans and a misting stack for cooling the air. Arrows indicate the direction of airflow.

Examples of an animal barn with an improved evaporative cooling system and related systems and methods are shown in FIGS. 1-23. Unless otherwise specified, an animal barn with an improved evaporative cooling system may, but is not required to contain at least one of the structures, components, functionalities, and/or variations described, illustrated, and/or incorporated herein.

Overview

The present disclosure describes embodiments of an improved structure for containing and sheltering livestock and related methods for cooling air within the structure. The methods may include carefully managing airflow speed throughout the structure to optimize the effectiveness of each component of the system and/or structure. The structure for sheltering livestock described in the present disclosure may take a variety of forms, for example, an animal barn. Although this disclosure is directed to an animal barn configured to house dairy cows, other types of structures, such as other kinds of barns, are also within the scope of this disclosure. In some embodiments, a barn comprises a traditional concrete barn configured to hold dairy cows. Other embodiments of the improved structure may include a barn or other enclosure configured to hold dairy cows and/or other kinds of livestock.

In some examples, there may be a plurality of large exhaust fans at one end of the barn and a misting stack at an opposite end. Air is drawn into the structure in a controlled method via a restricted opening in a wall of the misting stack; the air is slowed and then cooled by the misting stack, passes through a length of the barn where it cools livestock, and is pulled out of the barn by the plurality of large exhaust fans.

In some examples, a typical approximately 32-meter wide barn may use 10 to 12 approximately 8-foot diameter high-efficiency fans which use about approximately 65 horsepower. This produces an overall windspeed of approximately 11-12 miles per hour and an air exchange rate of approximately 1,000,000 cubic-feet-per-minute. In this embodiment, the air within the barn may be entirely exchanged approximately every 30 to 40 seconds which may result in an approximately 12 to 15 degree Celsius temperature drop. In another example, the system may provide for an airflow with a speed of at least about 9 miles per hour through the region for the livestock, measured, for example in the feed lane. The system may provide the airflow with a controlled speed in the range from about 9 miles per hour to about 11 miles per hour through the region for the livestock. Higher airflow speeds may be used for increases in ambient temperature and humidity. The system may provide airflow within the region for the livestock in the structure sufficiently to completely exchange the air within about 45 seconds.

In some examples, a size of the barn, a wind speed, and/or a desired air exchange time may be different and/or may be accomplished with a different number, type, and/or size of fans. For example, a Parlor barn may have an ideal wind speed of approximately 6 miles per hour, a heifer housing barn may have an ideal wind speed of approximately 5 to 8 miles per hour, and a young calves barn may have an ideal wind speed of approximately 3 to 5 miles per hour. Additionally or alternatively, fans may be staged to allow flexible operation at any suitable percentage of maximum ventilation capacity depending on the application and characteristics of the fans and the barn as well as external conditions. In some examples, suitable percentages of maximum ventilation capacity may include approximately 100%, 80%, 60%, 40%, or 20%. In some examples, the fans may be controlled automatically and/or manually. In some examples, fans may be controlled individually and/or in groups.

In some examples, fans may include safety features. Safety features may include any suitable structures depending on characteristics of the fans. For example, fans may have safety covers on the outside for personnel safety, and/or inlet shutters on the interior side that close when the fan is not in operation. In some examples, the inlet shutters may operate automatically. Additionally or alternatively, fans may have a minimum life expectancy depending on the characteristics and applications of the fans. For example, the fans may have an approximately 10 year minimum life expectancy for main components and/or major structures. In some examples, some components of the fans may have a different life expectancy. The fans may be constructed using any methods and component materials suitable to the system requirements for the fans, and typically the fans are large, industrial type, airfoil based, carbon fiber exhaust fans that achieve a high airflow with less power at high static pressures. The fans may be placed, e.g., at or adjacent one end of the barn to optimize airflow efficiency and minimize building costs.

In some examples, baffles may be provided at selected locations to increase air speed and/or to breakup laminar flow. Baffles may include any suitable structures and/or materials depending on the application. For example, interior baffles may include translucent material to allow optimum light penetration.

The misting stack, which may also be referred to as an initial cooling stack chamber, may be used to intake and cool air before it passes through the barn. The air inlet may be restricted, small, sheltered, and/or partially covered. This decreases the impact of external conditions such as external wind speed, wind direction, or pressure on the airflow within the barn. For example, baffles may provide a barrier between outside influences like wind and the controlled airflow within the barn. Restricting the size of the air inlet may also initially increase the air speed entering the misting stack. The misting stack may include more than one air inlet and one or more of these air inlets may be oriented in any of a variety of directions. In some examples, air intake is omnidirectional which may also lessen outside influences such as external wind speed and direction. In general, the shape, size, and/or location of the air inlets may be selected to ensure consistent air flow across the barn. The air inlets may be configured to allow outside air to enter the barn with minimal interference from external wind. In some examples, the air inlets may be configured to protect the air flow inside the barn from interference by external wind of up to approximately 65 kilometers per hour.

In some examples, after passing through the restricted air inlet, the air may enter a large mixing chamber where it slows down to allow more evaporation time and therefore more complete evaporation of water particles. More complete evaporation of the water particles may ensure that the air flowing over the livestock is fully dry and maximizes the cooling effect of the misting stack.

The misting stack may be configured to include three different evaporation zones. Which zone or zones is used may depend on the external conditions. Zone 1 may include a first high pressure mist. Zone 2 may include a second high pressure mist which may be used when the external heat increases. Zone 3 may include a low pressure mist for extreme conditions. In some examples, the second high pressure mist of zone 2 may be a heavier mist, that is, may put out a larger quantity of water, than the first high pressure mist. In some examples, zone 2 may be used in place of zone 1 when the external heat exceeds a first predetermined threshold. In some examples, the second high pressure mist of zone 2 may be the same as the first high pressure mist of zone 1. In some examples, zone 2 may be used in addition to zone 1 when the external heat exceeds a first predetermined threshold. In some examples, the low pressure mist of zone 3 may be used in addition to the high pressure mist(s) of zone 1 and/or zone 2. In some examples, the low pressure mist of zone 3 may be used in place of the high pressure mist(s) of zone 1 and/or zone 2.

The low pressure misting system of zone 3 may run at any suitable flow rate and pressure. In some examples, the low pressure misting system of zone 3 may have a flow range of approximately 3 gallons per minute per unit. In some examples, the low pressure misting system of zone 3 may run at a pressure of standard domestic water supply or approximately 40 to 70 pounds per square inch. The high pressure misting systems of zones 1 and 2 may run at any suitable flow rates and pressures. In some examples, the high pressure misting systems of zones 1 and 2 may run at different flow rates and/or pressures. In some examples, the high pressure misting systems of zones 1 and 2 may run at the same flow rate and/or pressure. In some examples, the high pressure misting systems of zones 1 and 2 have a flow range of approximately 5 or 10 gallons per minute per unit. In some examples, the high pressure misting systems of zones 1 and 2 may run at a pressure of approximately 500 to 1,000 pounds per square inch.

In some examples, the high pressure misting system of zones 1 and 2 may be configured to provide any suitable temperature drop depending on the volume of air. In some examples, the high pressure misting system may be configured to provide an approximately 15 degree Celsius temperature drop. The high pressure misting system of zones 1 and 2 may be configured to provide a mist of any suitable size. For example, the high pressure misting system may provide a mist with droplets smaller than approximately 20 microns. The high pressure misting system may include any suitable structures. For example, the high pressure misting system may include electric motor driven high pressure pumps, corrosion resistant high pressure plumbing lines, and/or misting nozzles. In some examples, the high pressure misting system may be configured to be staged at misting capacities corresponding to the ventilation capacities of the fans as described above. For example, the high pressure misting system may be configured to be staged at any suitable percentage of maximum misting capacity. In some examples, suitable percentages of maximum misting capacity may include approximately 100%, 80%, 60%, 40%, or 20%. The high pressure misting system of zones 1 and 2 may be configured to eliminate and/or contain drips while fully evaporating moisture in the air prior to the air reaching cow living spaces in the barn.

In some examples, the low pressure misting system of zone 3 may be configured to provide any suitable temperature drop depending on the volume of air. In some examples, the low pressure misting system may be configured to provide an approximately 5 degree Celsius temperature drop. In some examples, this may be in addition to the temperature drop provided by the high pressure misting systems of zones 1 and 2. In some examples, this may be instead of the temperature drop provided by the high pressure misting systems of zones 1 and 2. The low pressure misting system of zone 3 may be configured to provide a mist of any suitable size. For example, the low pressure misting system may provide a mist with droplets smaller than approximately 80 microns. In some examples, this may be accomplished without high pressure pumps. The low pressure misting system may include any suitable structures. The low pressure misting system of zone 3 may be configured to minimize and/or contain drips while fully evaporating a maximum amount of moisture in the air prior to the air reaching cow living spaces in the barn.

In some examples, variable frequency drives and/or individual control of which lines of misting nozzles are on or off may allow a user to further subdivide the zones. Subdividing the zones and/or individually controlling lines of misting nozzles may allow the user to have more control and, thus, may allow the user to adapt to specific external conditions.

Additionally, or alternatively, a barn having an evaporative cooling system may include a cow soaking system. The cow soaking system may be configured to operate at a low water pressure. For example, the cow soaking system may operate at any suitable pressure depending on the application and characteristics of the system. In some examples, the cow soaking system may operate at approximately 2.5 to 3 bar. In some examples, the cow soaking system may be controlled by the same control system which controls the high and low pressure misting systems. The cow soaking system may include soaker nozzle assemblies. The soaker nozzle assemblies may be configured to provide large water droplets which may penetrate the hair on the livestock. This may facilitate proper cooling of the livestock. Additionally, or alternatively, the soaker nozzle assemblies may include check valves to prevent draining of a main soaker line. The soaker nozzle assemblies may be positioned in any suitable location depending on the application and the characteristics of the barn. For example, the soaker nozzle assemblies may be mounted above cow headlocks in a feed lane area. In some examples, the soaker nozzle assemblies may be mounted on a rigid supply line. In some examples, the rigid supply line may include PVC or HDPE piping. The soaker nozzle assemblies may be positioned at any suitable spacing depending on the application and the characteristics of the barn.

Baffles may be included in various places within the barn to redirect air flow as needed; for example, baffles may redirect air flow to regions of the barn that contain livestock and away from regions of the barn that do not need to be cooled. Such additional baffles may prevent waste of cool air on empty portions of the barn or portions of the barn that are dedicated to storage or transportation of equipment. In some examples, the baffles may also include doors and/or baffles used to define a ventilation zone and to segregate a feed truck drive lane from the ventilation zone to lessen wasted air. In addition to extra baffles to direct air flow, the structure may lack fans in line with the truck drive lane since high speed air is unnecessary in the truck drive lane.

A control system may be used to integrate the operation of the fans, the high and low pressure misting systems, and the soaking system. Integrating the operation of each of the components of the evaporative cooling system may provide for more flexibility of operation and/or implementation of cooling strategies. The barn may have any suitable number, configuration, and/or type of controllers. For example, each barn may have three controllers. In some examples, each controller operates independently. In some examples, the controllers may communicate with each other and/or a central computer. In some examples, one controller may control the fans, one controller may control the high and low pressure misting systems, and one controller may control the cow soaking system. Each controller may include any suitable structures and/or features depending on the application and the characteristics of the barn and the cooling system.

For example, each controller may include sensors to measure an ambient temperature, humidity, wind speed, and/or pressure. In some examples, internal temperature, humidity, and/or wind speed may be measured in more than one location of the barn. In some examples, each controller may graphically and/or numerically display any suitable measured, calculated, and/or simulated quantity. In some examples, suitable measured, calculated, and/or simulated quantities may include external and/or internal temperature, external and/or internal humidity, internal wind speed, internal pressure, and/or simulated expected performance.

Additionally, or alternatively, each controller may monitor water and/or power consumption of one or more components of the evaporative cooling system. In some examples, amounts of water and/or power used by each part of the system may be displayed by each controller and/or by a central computer. In some examples, displaying amounts of power and/or water used may include displaying instantaneous usage and/or daily totals. In some examples, displaying amounts of power and/or water used may include use of a graphical display.

In some examples, each controller may operate automatically based on internally stored operational parameters. In some examples, the operational parameters of each controller may be able to be updated by a central computer. In some examples, each controller may be configured to initiate an alarm in response to abnormal and/or out of tolerance operating conditions. An alarm may include any suitable sound, light, and/or other suitable audial or visual cue.

Each controller may include any suitable construction. For example, each controller may include a durable module designed to operate in harsh conditions such as those found in livestock areas. In some examples, the controllers may be replaceable. In some examples, replacement may take approximately 5 to approximately 20 minutes. In some examples, the controllers may include ethernet wiring. In some examples, the controllers may be connected via radio wave/wireless technology.

In some examples, the control system for an evaporative cooling system may include a central computer. The central computer may be configured to monitor the performance of one or more of the controllers and/or subsystems. The central computer may include any suitable capabilities and/or features depending on the application and the characteristics of the evaporative cooling system. In some examples, the central computer may be configured to store information and/or data about the performance and/or operation of the cooling system. In some examples, the central computer may be configured to graphically and/or numerically display operational information and/or abnormal or out of tolerance conditions. In some examples, the central computer may be configured to allow an authorized user to monitor system performance and/or to adjust, change, and/or reprogram operational parameters to optimize a cooling strategy.

Livestock, such as dairy cows, are cooled by two primary mechanisms: wind chill and temperature drop. The misting stack ensures that the air in the barn is cooled compared with external conditions, thus cooling the livestock. The exhaust fans, in addition to removing air that has warmed up through contact with the livestock, ensure continuous air flow. The continuous air flow cools the livestock through wind chill. When the temperature exceeds a predetermined temperature threshold (for example approximately 115 degrees Fahrenheit), big droplets are used. In some examples, this may correspond to using zone 3. In some examples, the big droplets may be used so that the air reaching the livestock is slightly damp which may help cool the livestock even further using natural evaporation.

Illustrative Embodiments

FIG. 1 shows an illustrative embodiment of a structure S, such as a cow barn having an evaporative cooling system 100 installed to structure S. Structure S may include a first end 102, a second end 104 opposite the first end, and two sides 106, 108 opposite one another, with the two sides extending between the first end and the second end. Such structure may further include a roof 110 above the ends and sides. Structure S may provide within the ends, sides, and roof at least one region 112 (see also FIG. 17) for the livestock. System 100 may be configured to provide an airflow 114 to the structure for cooling the livestock and exchanging air with the region for the livestock. The arrows 114*a-e* in FIG. 1 show the path and the direction of the airflow.

Figure 4:
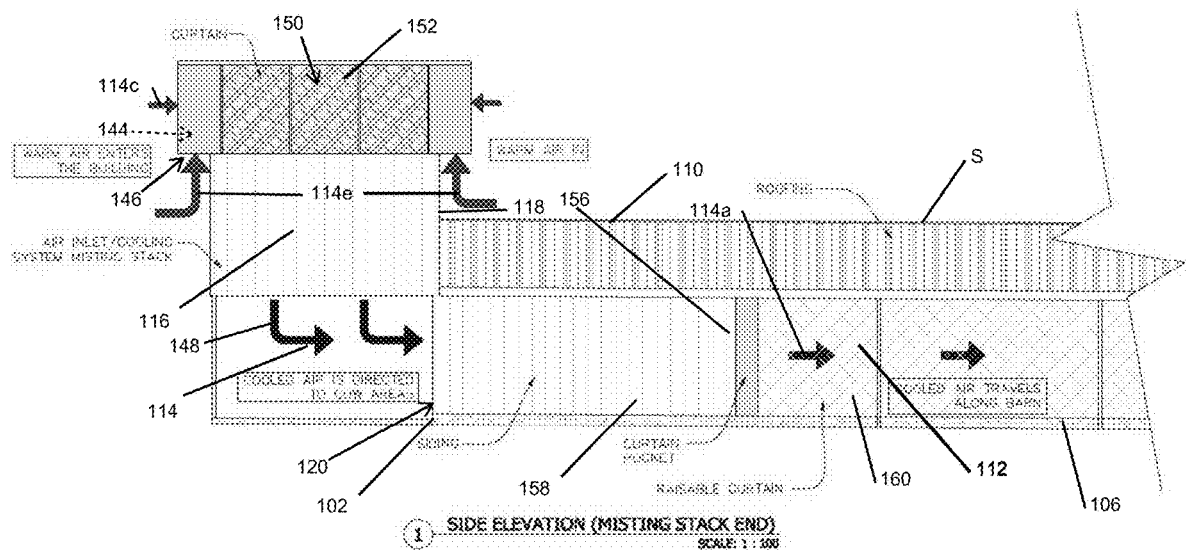
FIG. 4 is a side elevation view of the misting stack end of the barn. Arrows indicate the direction of airflow.

The system may include an evaporation zone 116 configured to be positioned adjacent first end 102 of structure S. Evaporation zone 116 may include a wall 118 configured to separate in part evaporation zone 116 from first end 102 of structure S. As best seen in FIG. 4, evaporation zone 116 may further include an opening 120 adjacent wall 118. Opening 120 may be configured to allow airflow 114 to pass from evaporation zone 116 into region 112 for livestock in structure S.

System 100 may include one or more exhaust fans 122, e.g., six exhaust fans along second end 104 and two exhaust fans on each of sides 106 and 108 close to end 104, as shown in FIG. 1, where exhaust fans 122 may be seen positioned adjacent second end 104 of structure S. Each exhaust fan may include an inlet side 124 (FIG. 18) facing region 112 for the livestock. As shown in the figures, exhaust fans 122 may be configured to draw airflow 114 through structure S to inlet side 124 and out through the exhaust fan to the external environment.

Figure 2:
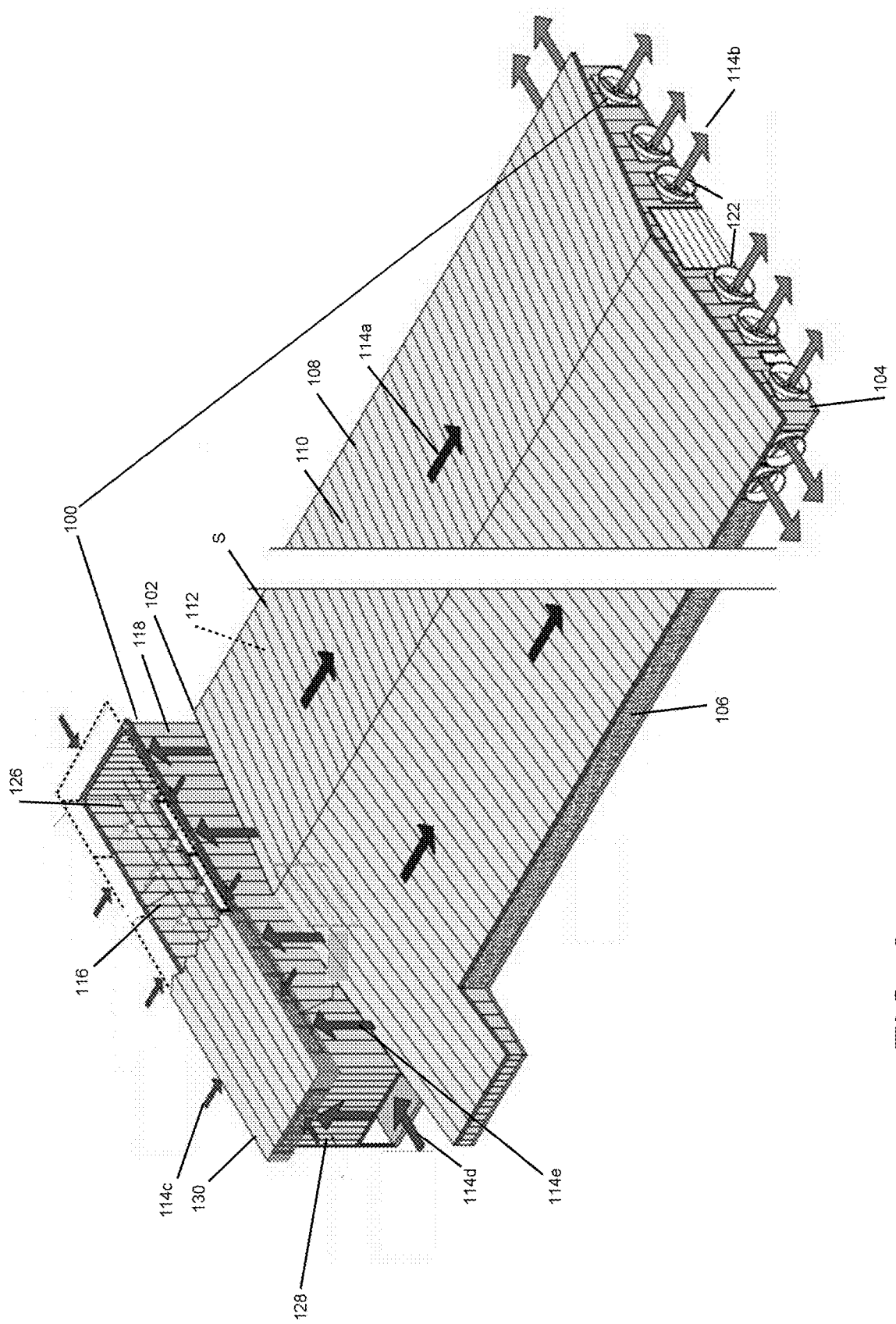
FIG. 2 is a magnification of the two ends of the barn in FIG. 1. The fans and the air cooling structure are visible in more detail. Arrows indicate the direction of airflow.
Figure 3:
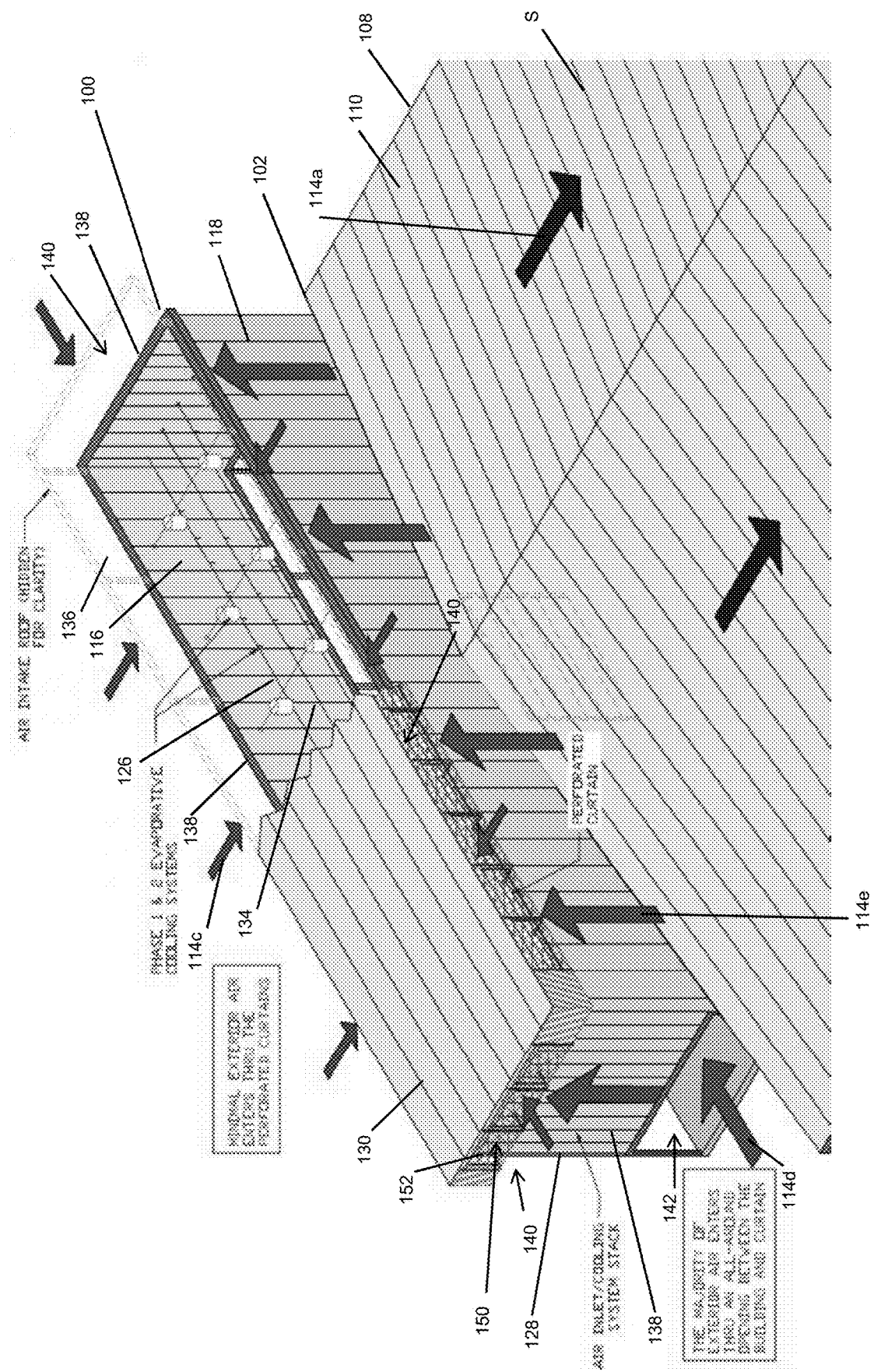
FIG. 3 is a magnified view of the misting stack shown in FIGS. 1 and 2. Arrows indicate the direction of airflow, including in a horizontal direction through a perforated curtain below the roof.

System 100 may include a misting stack 126 defined by a chamber 128 that may include a roof 130 with evaporation zone 116 in misting stack 126 below roof 130. Part of roof 130 of misting stack 126 is cut away in FIGS. 1-3*a* to show some of the internal structure. FIG. 2 shows the same embodiment magnified to better show misting stack 126 and exhaust fans 122. FIG. 3 is a magnified view of end 102 of barn S where the misting stack is located.

Figure 3A:
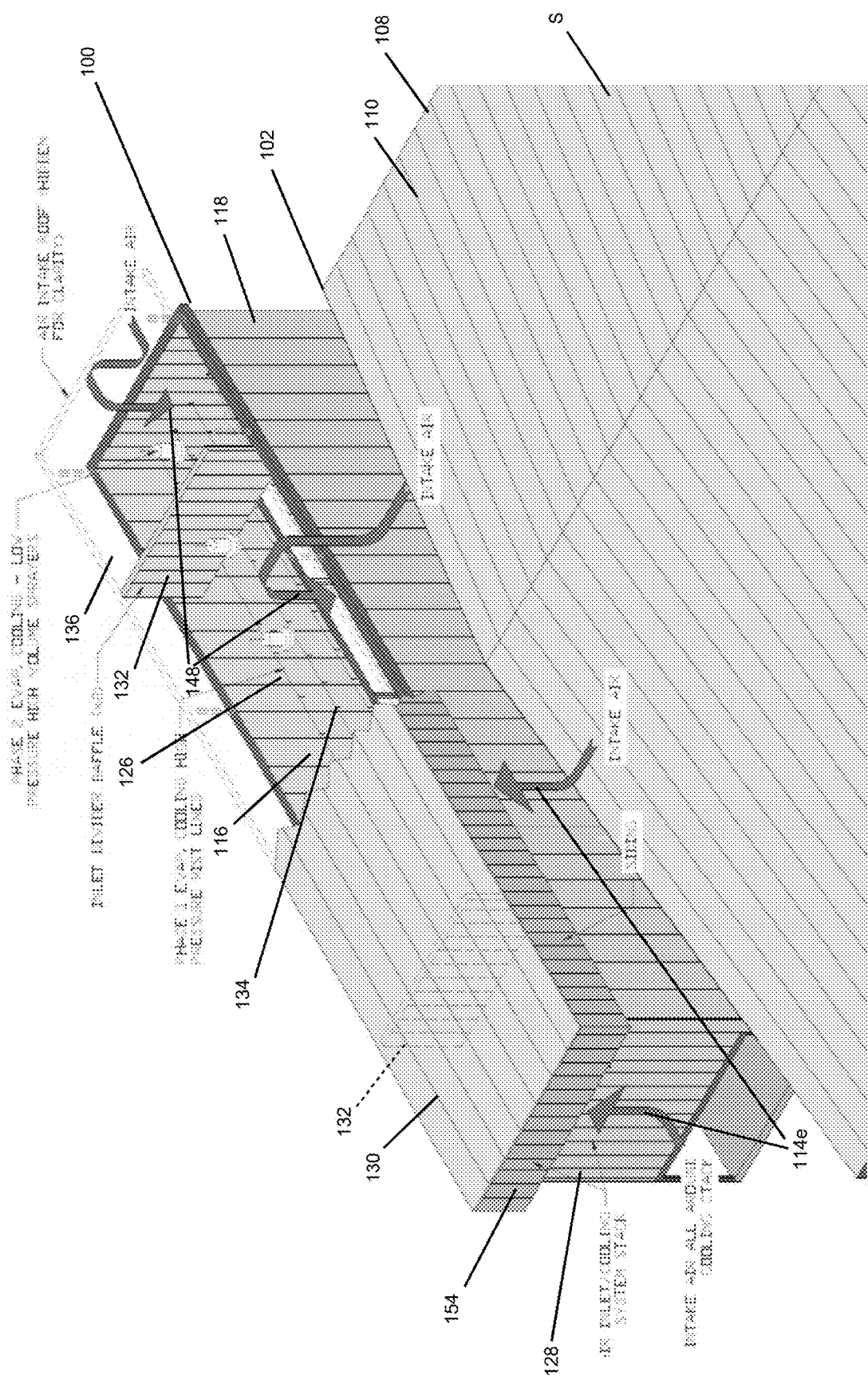
FIG. 3a is a magnified view of the misting stack similar to FIG. 3, but with vertical siding in a panel below the roof in place of the perforated curtain, and additionally showing two inlet divider baffles in the misting stack under the roof and above the high pressure mist lines.

FIG. 3*a* is a view similar to that of FIG. 3 and additionally showing two inlet divider baffles 132 in misting stack 126 under roof 130 and above a set of high pressure mist lines 134. Inlet divider baffles 132 may operate as vanes within an upper portion 136 of misting stack 126 and may be particularly useful in a condition where a high external wind is directed at one side of misting stack 126 when placed on that side of misting stack 126 to reduce airflow to the adjacent air inlet and to balance the air pressure and airflow distribution within the misting stack.

Misting stack 126 may be in chamber 128, which may be formed in part by wall 118. Chamber 128 may be formed by three walls 138 in addition to wall 118 or may be formed with any configuration or shape suitable to a particular application. Chamber 128 may include one or more air inlets 140, which typically are positioned below roof 130 or chamber 128 may include an essentially circumferential air inlet below roof 130, interrupted only by necessary structural support.

Air may be drawn from the external environment into misting stack 126 and from there into end 102 of structure S from a variety of directions and, in some examples, primarily at upper portion 136 of misting stack 126. In some examples including those shown in FIGS. 1-4, some of the air may be drawn in the bottom of the misting stack, e.g., at a lower opening 142 in chamber 128, as shown by arrows 114*d*, or some other portion of the misting stack.

Air inlets 140 may include inlets for air travelling in either a substantially horizontal direction and/or a substantially vertical direction. In some examples, air travels upward, as indicated by arrows 114*e*, along one or more of walls 118 and 138 of chamber 128, and through a vertical passage 144 after entering through a restricted air inlet 146 and before entering evaporation zone 116 in the mixing chamber (see, e.g., FIGS. 4 and 14). Chamber 128 may provide for the airflow to include a portion 148 passing downward through the evaporation zone toward opening 120 adjacent wall 118. As shown in FIG. 4, opening 120 may be located below wall 118.

In some examples, an unobstructed opening of one or more vertical air inlet passages 144 may have a total area of approximately 70 square meters or any other suitable area. In some examples, the air may travel upwards for a vertical distance of approximately 0.7 meters or any other suitable distance. In some examples, the ratio of the vertical distance to the width of the opening may be approximately 1:1 or approximately 1.25:1. In some examples, the ratio may have any other value suitable to the particular application of the system.

The air typically increases in speed as it passes through the restricted air inlet and the vertical passage. The system may provide airflow with a speed of at least about 1500 feet per minute through the at least one air inlet. A high speed airflow minimize outside influence. The air typically decreases in speed once it enters evaporation zone 116 in the mixing chamber that may provide a larger volume. This may ensure that the air spends long enough in the mixing chamber for the water to fully evaporate. In one or more embodiments, the height of the misting stack may be selected for the system to provide for an air retention time of about 2.5 seconds. The system may provide the airflow with a speed of at least about 550 feet per minute through the evaporation zone, which is believed to optimize cooling effects.

Air may also enter the misting stack through one or more openings 150 for horizontal airflow. In some examples, such horizontal opening(s) may be obstructed by a perforated curtain 152. In some examples, the perforated curtain may be a woven fabric with gaps between the threads. In some examples, the gaps may be approximately 0.018 inches by approximately 0.018 inches or any other suitable dimensions. In some examples, gaps of approximately 0.018 inches by approximately 0.018 inches may correspond to an effective open surface area of approximately 20% of the surface area of the curtain. In some examples, the perforated curtain may have any other suitable effective open surface area. In some examples, approximately 12% of the total air intake passes through the perforated curtain.

In the example as shown in FIG. 3*a*, vertical siding 154 is in place of perforated curtain 152 below roof 130. Vertical siding 154 may cover some or all of opening 150 in any of the embodiments of the present disclosure, as may be suited to a particular environment of application of the system, e.g., in higher winds.

In some examples, the vertical cross sectional area of a main cow portion of the barn is smaller than the vertical cross sectional area of the mixing chamber. In some examples, this may increase a speed of the air as it passes through the main cow portion of the barn. In some examples, the speed of the air as it passes through the main cow portion of the barn may also be increased by the use of exhaust fans 122 at an end 104 of barn S opposite the misting stack.

As described above, a cow barn S having an evaporative cooling system may include 8 to 10 approximately eight-foot exhaust fans 122. In some examples, the fans may include any suitable structure configured to move an appropriate amount of air. In some examples, the fans may be configured to move approximately 100,000 cubic feet of air per minute. In some examples, the fans may all move at the same speed. In some examples, one or more of the fans may move at different speeds under control of manual or automatic control systems as described herein to be operable to vary airflow 114. In some examples, all of the exhaust fans may be oriented in the same direction. In some examples, some of the exhaust fans may be oriented in a first direction and some of the exhaust fans may be oriented in one or more additional direction(s). In some examples, the first direction may be out end 104 of barn S and the additional direction(s) may be out one or both of sides 106, 108 of barn S.

Figure 5:
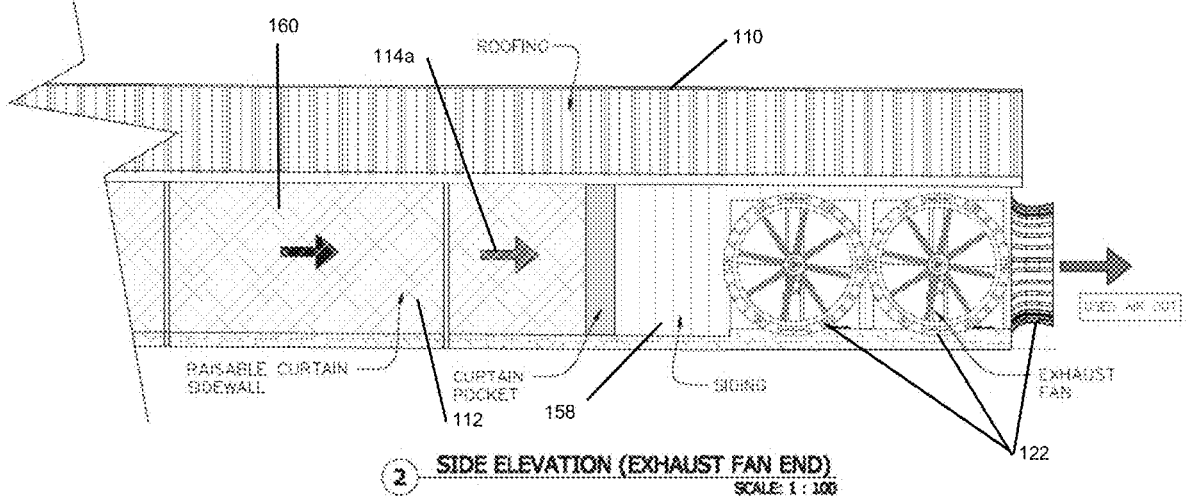
FIG. 5 is a side elevation view of the exhaust fan end of the barn. Arrows indicate the direction of airflow.

FIG. 4 shows a side elevational view of a misting stack 126 at end 102 of barn S. Arrows indicate the various directions of airflow 114: 114*e* up through the restricted air inlets 146, 148 down through and 114 out of evaporation zone 116 in the mixing chamber, and 114*a* along the main cow portion of the barn. As discussed above, in some examples, misting stack 126 may include a perforated curtain 152. In some examples, the perforated curtain may be used to cover some or all of a set of horizontal air inlets, for example as protection against high external wind speeds or precipitation. A percentage of the total air intake may pass through perforated curtain 152. FIG. 5 shows a side elevation view of an exhaust fan end 102 of barn S.

In some examples, a main cow portion of barn S that provides region 112 for the livestock, may include a partition 156 along sides 106 and 108. Partition 156 may include one or more portion(s) with siding 158 and may include one or more portion(s) with a raisable curtain sidewall 160. An example of siding 158 and raisable curtain sidewall 160 are visible in FIGS. 4 and 5. The system may include at least one curtain 160 configured to be deployed along at least one side of the structure. Curtain 160 may be configured to be rolled up and may be translucent to allow natural light into the barn. In some examples, raisable curtain sidewall 160 may act as a removable wall for the side of the barn which can be removed, which may be rolling up, raising, or otherwise, during mild weather to provide natural cooling and air ventilation. During hot weather, raisable curtain sidewall 160 may be lowered in order to isolate the cooled and controlled air flow 114 provided by misting stack 126 from the hot external air.

Figure 6:
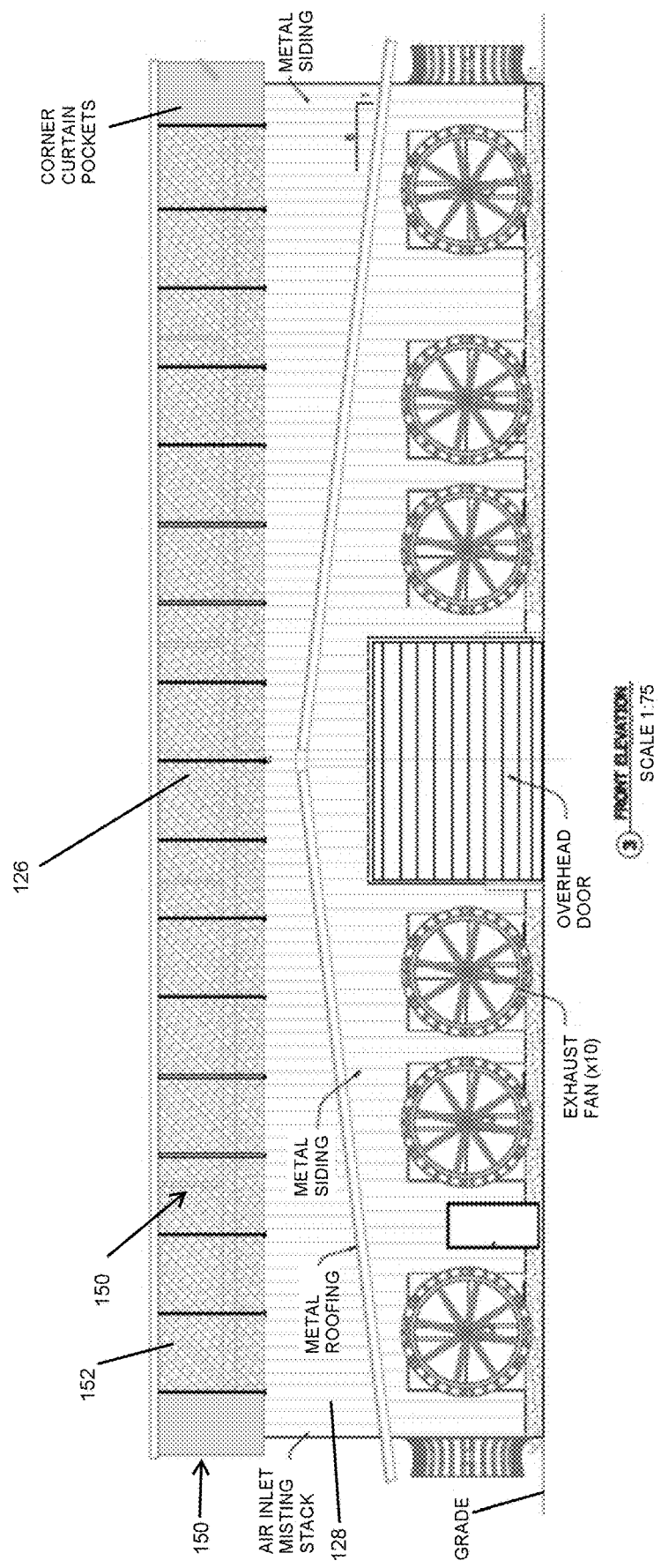
FIG. 6 is a front elevation view of the barn. Some of the exhaust fans and the side of the misting stack are visible.
Figure 7:
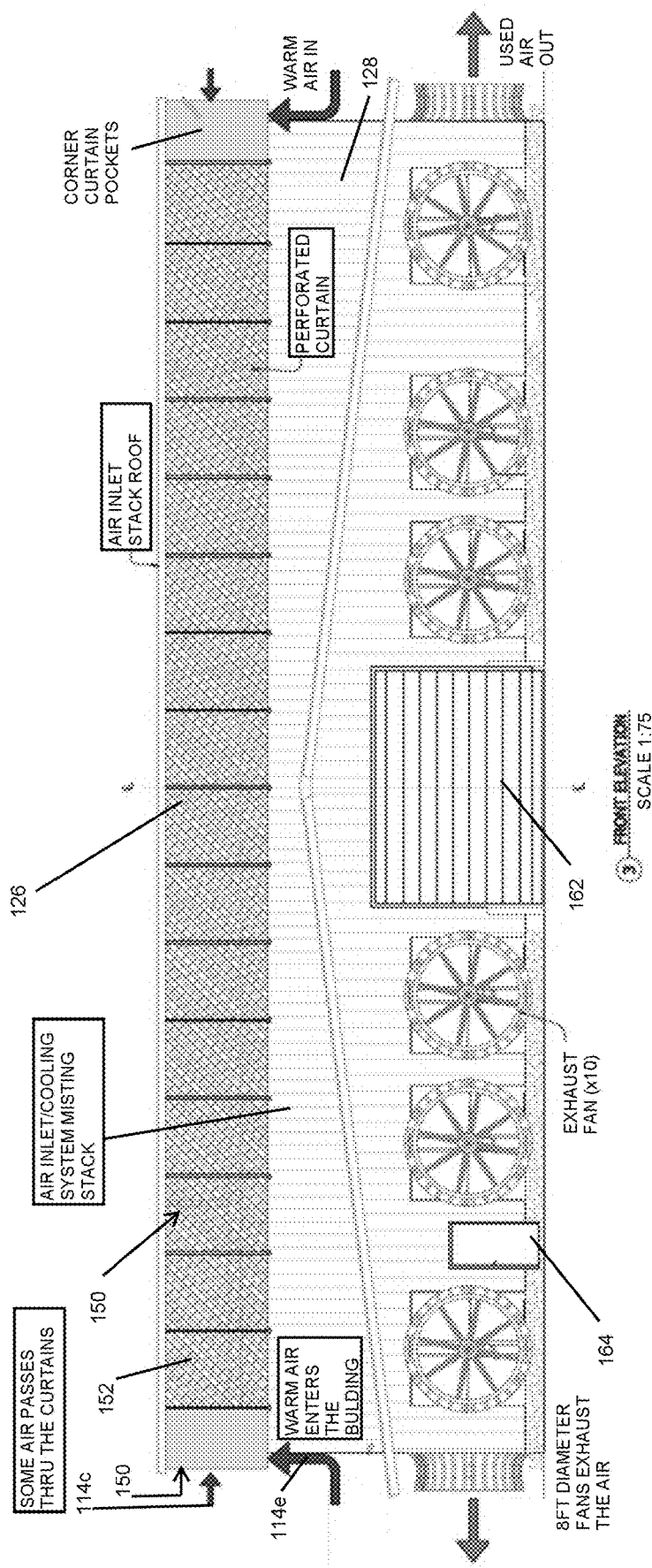
FIG. 7 is another front elevation view of the barn. Some of the exhaust fans and the misting stack are visible. Arrows indicate the direction of airflow.

FIGS. 6 and 7 show front elevation view of the barn. FIG. 7 includes arrows 114*c*, 114*e* which indicate the direction of portions of the air flow. The exhaust fan end 102 of the barn may include a large rolling door 162 for trucks or other equipment to pass through. The exhaust fan end of the barn may also include an access door 164 for humans, such as workers, to pass through.

Figure 8:
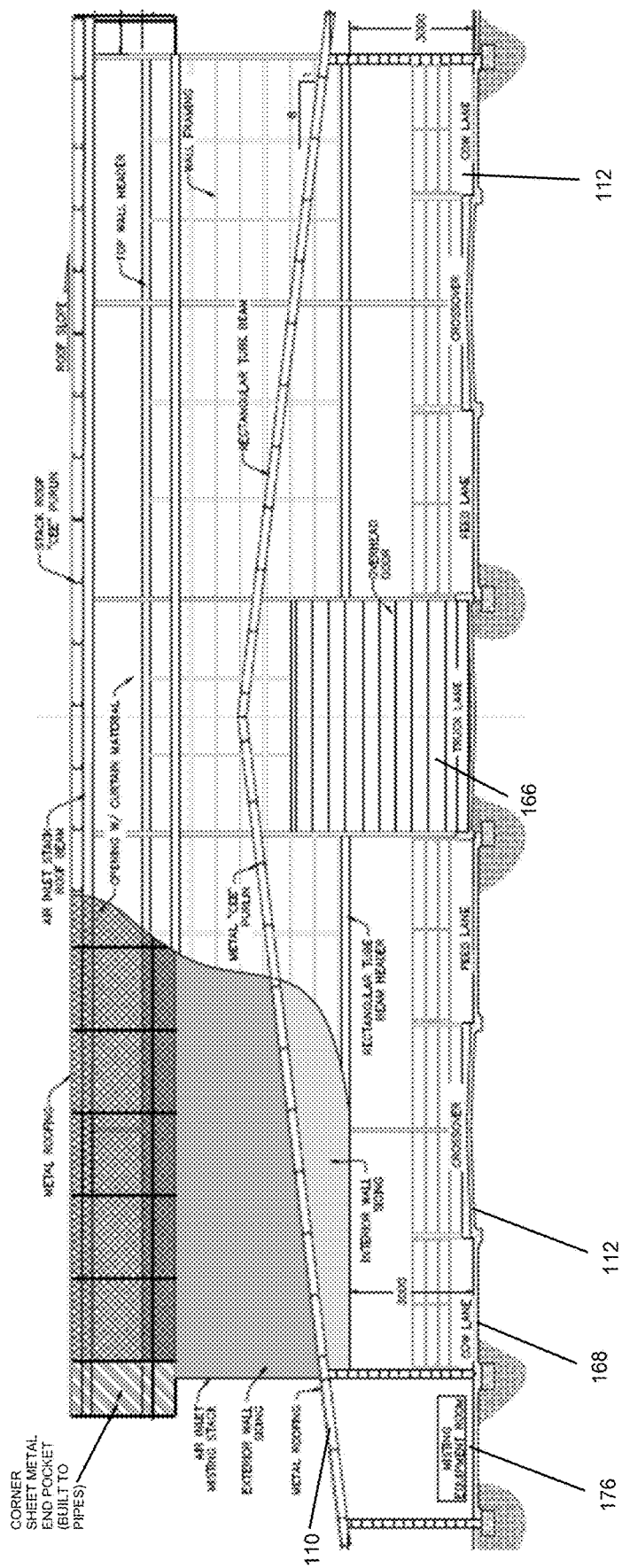
FIG. 8 is a section view of the central portion of the barn for holding cows. Some of the internal structure of the barn is visible.
Figure 9:
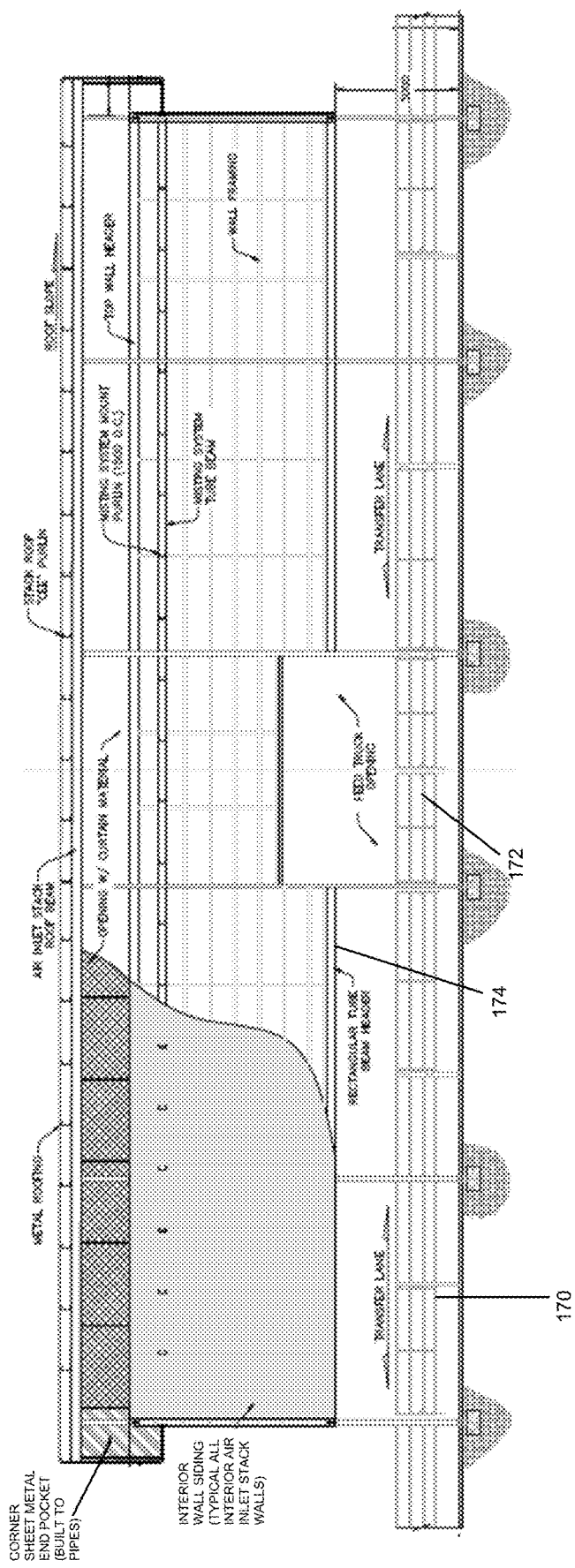
FIG. 9 is another section view of the barn for holding cows. Some of the internal structure of the barn is visible.

FIGS. 8 and 9 are section views of region 112 in the central portion of the barn for holding cows. Some of the internal structure of the barn is visible; for example, truck lanes 166, cow lanes 168, a transfer lane 170, feed truck openings 172, and beams such as rectangular tube beam headers 174. The barn may also include or be adjacent to a mist equipment room 176. Areas such as truck lanes 166 and feed truck openings 172 are regions of barn S that are not for the livestock, and one or more baffles, such as curtain baffles 178 (FIG. 17) and/or doors may be provided in barn S to redirect the airflow away from truck lane 166 and other regions not for the livestock.

The barn may include metal roofing 110. In some examples, the barn may include any suitable kind of roof configured to retain heat and keep an inside of the barn dry. The ceiling of the barn may be modified to force a majority of airflow to the region 112 for the livestock. The ceiling and the inlet stack may be internally lined with a liner to provide cosmetic appeal and also enable minimum disturbance to the designed airflow. The barn may constructed with an air tight structure, with the exception of the inlets described herein, to prevent loss of cooled air, infiltration of external hot air, and/or reduction of total air velocity. The barn may include a gravity feed flush waste cleanup system, which also contributes to the overall cooling affect of the entire barn system by, e.g., removing heat-producing waste, and also improves odor control, which is additionally a goal of the air cooling system.

Figure 10:
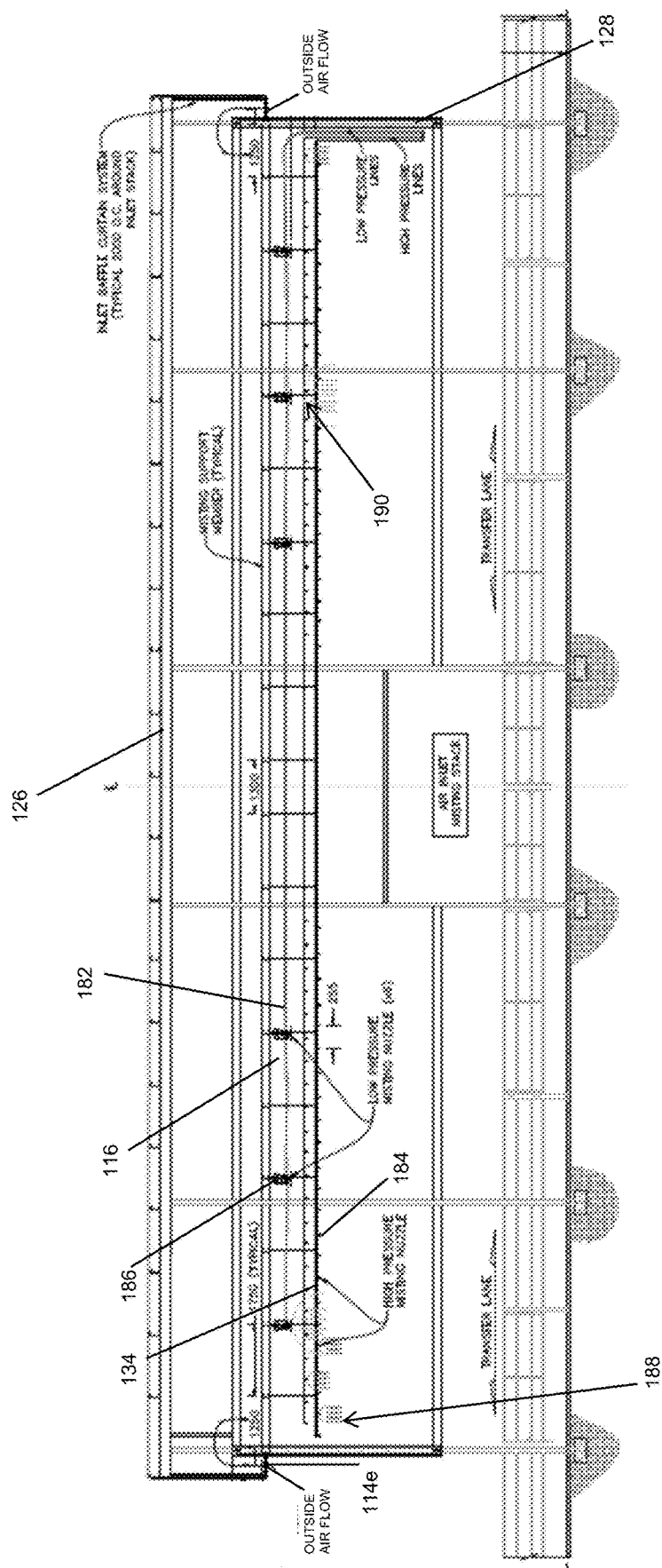
FIG. 10 is a section view of the misting stack end of the barn. Some of the internal structure of the misting stack is visible.
Figure 11:
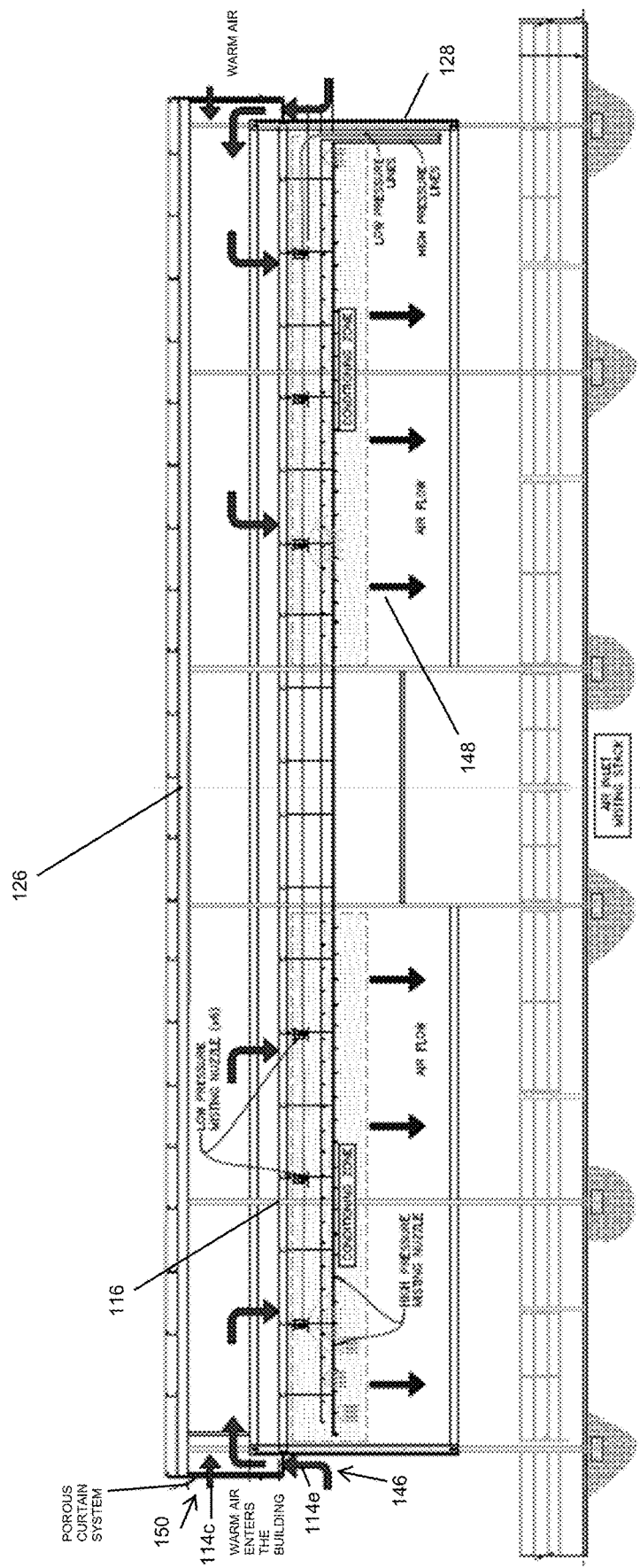
FIG. 11 is a section view of the misting stack. Arrows indicate the direction of airflow.
Figure 12:
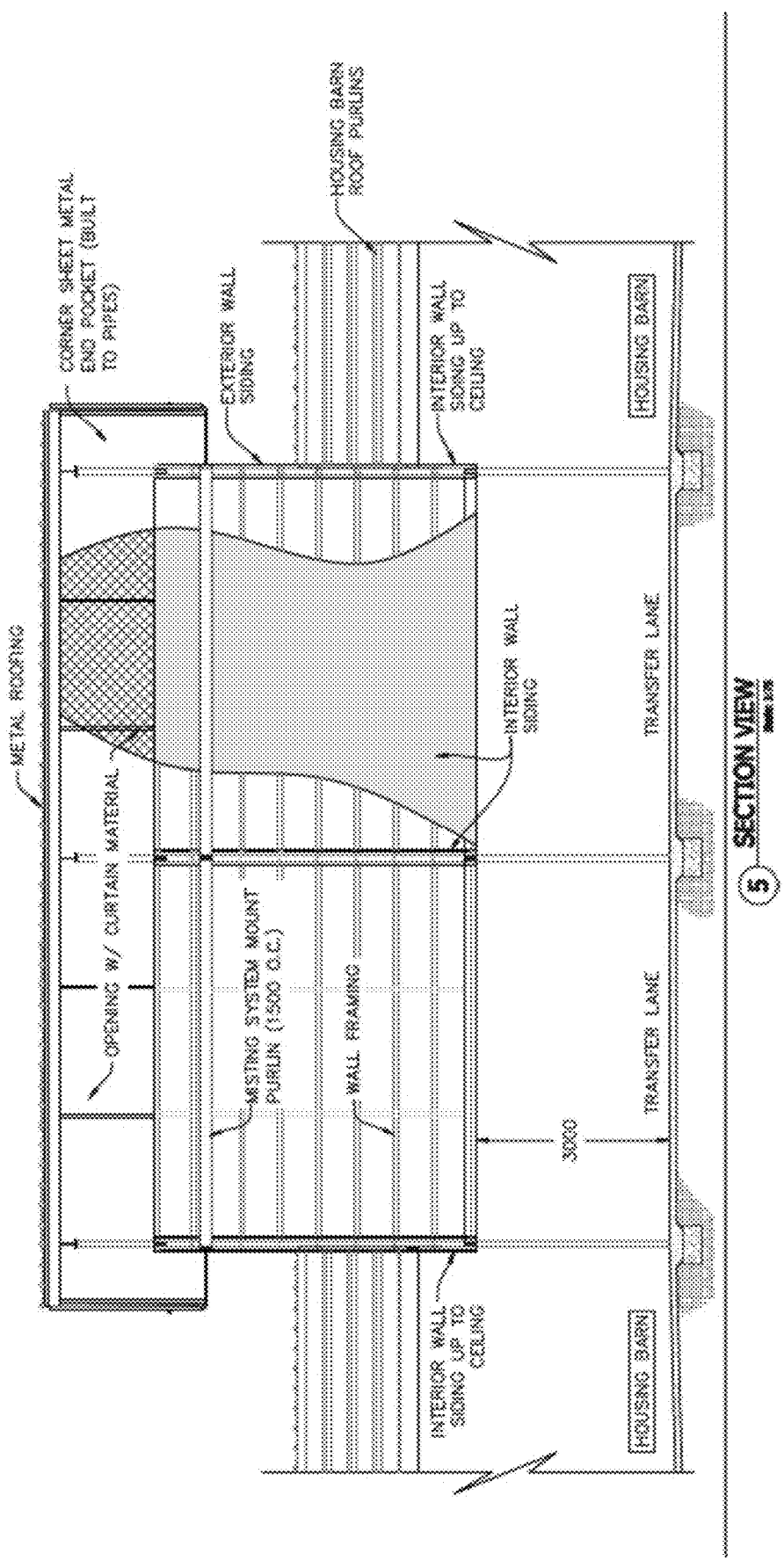
FIG. 12 is another section view of the misting stack end of the barn.
Figure 13:
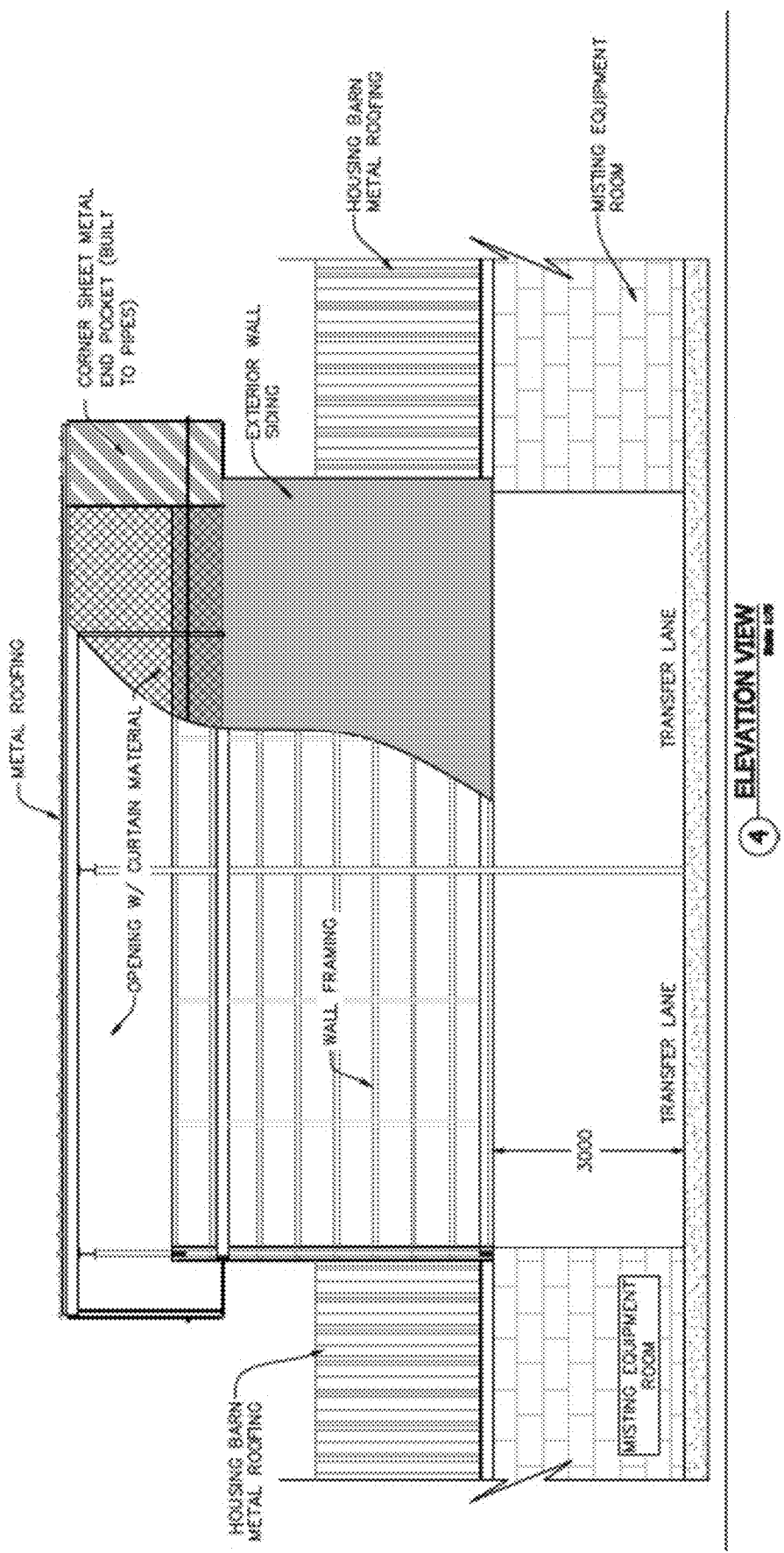
FIG. 13 is an elevation view of the misting stack end of the barn.

FIGS. 10 and 12 are section views of misting stack 126 at end 102 of barn S and FIG. 11 is a section view of misting stack 126. FIG. 13 is an elevation view of the misting stack end of the barn. Arrows in FIGS. 10 and 11 indicate the direction of airflow including horizontally 114c through opening(s) 150 and vertically 114e through opening(s) 146. Some of the internal structure of the misting stack is visible, for example in evaporation zone 116 a conditioning zone 180 where the misting nozzles are located. Separate high pressure lines 134 and low pressure lines 182 may be used to supply the different zones described above using high pressure nozzles 184 and low pressure nozzles 186. As shown in FIGS. 10 and 11, evaporation zone 116 may include a high pressure misting zone 188 and a low pressure misting zone 190. Either or both of high pressure misting zone 188 and low pressure misting zone 190 may be selectively operable to accommodate varying environmental conditions using manual or automatic control systems as described herein.

Figure 14:
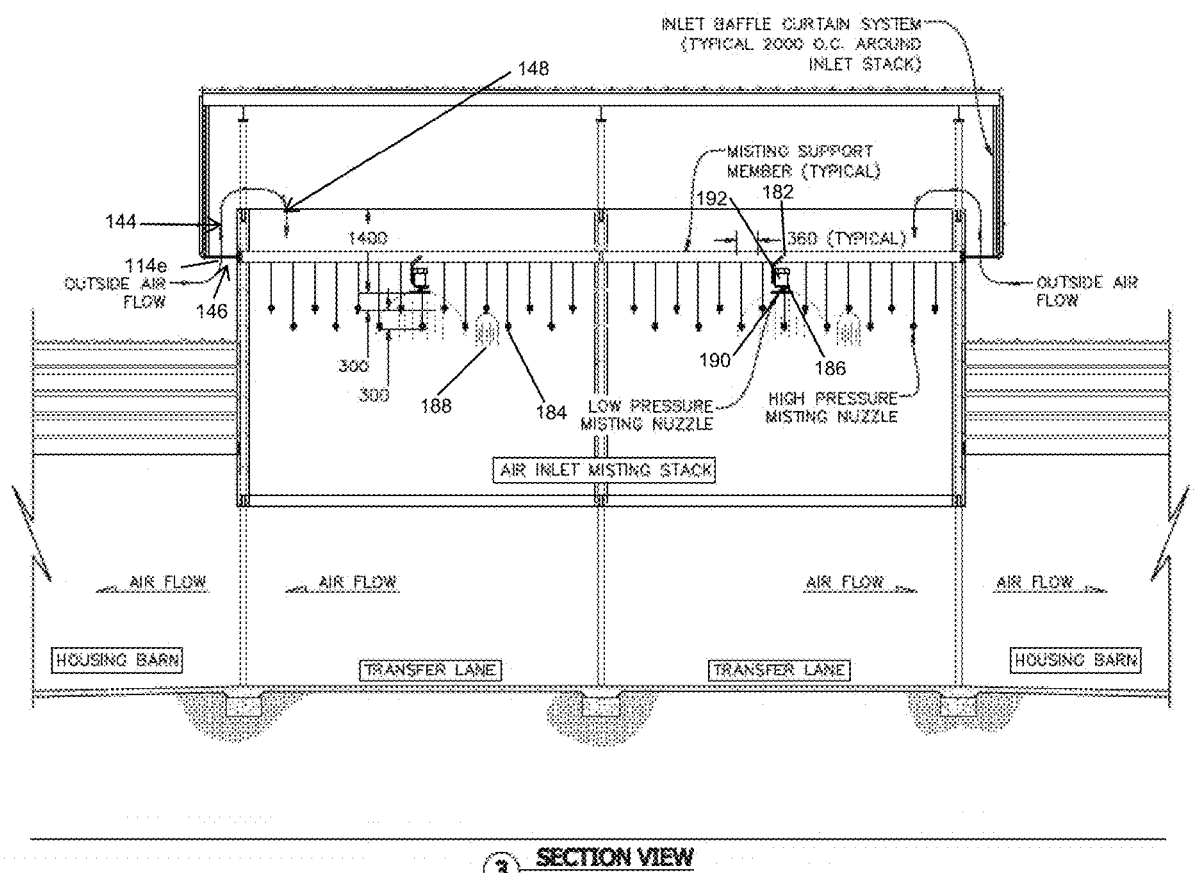
FIG. 14 is another section view of the misting stack end of the barn. This figure shows the misting nozzles in greater detail.
Figure 15:
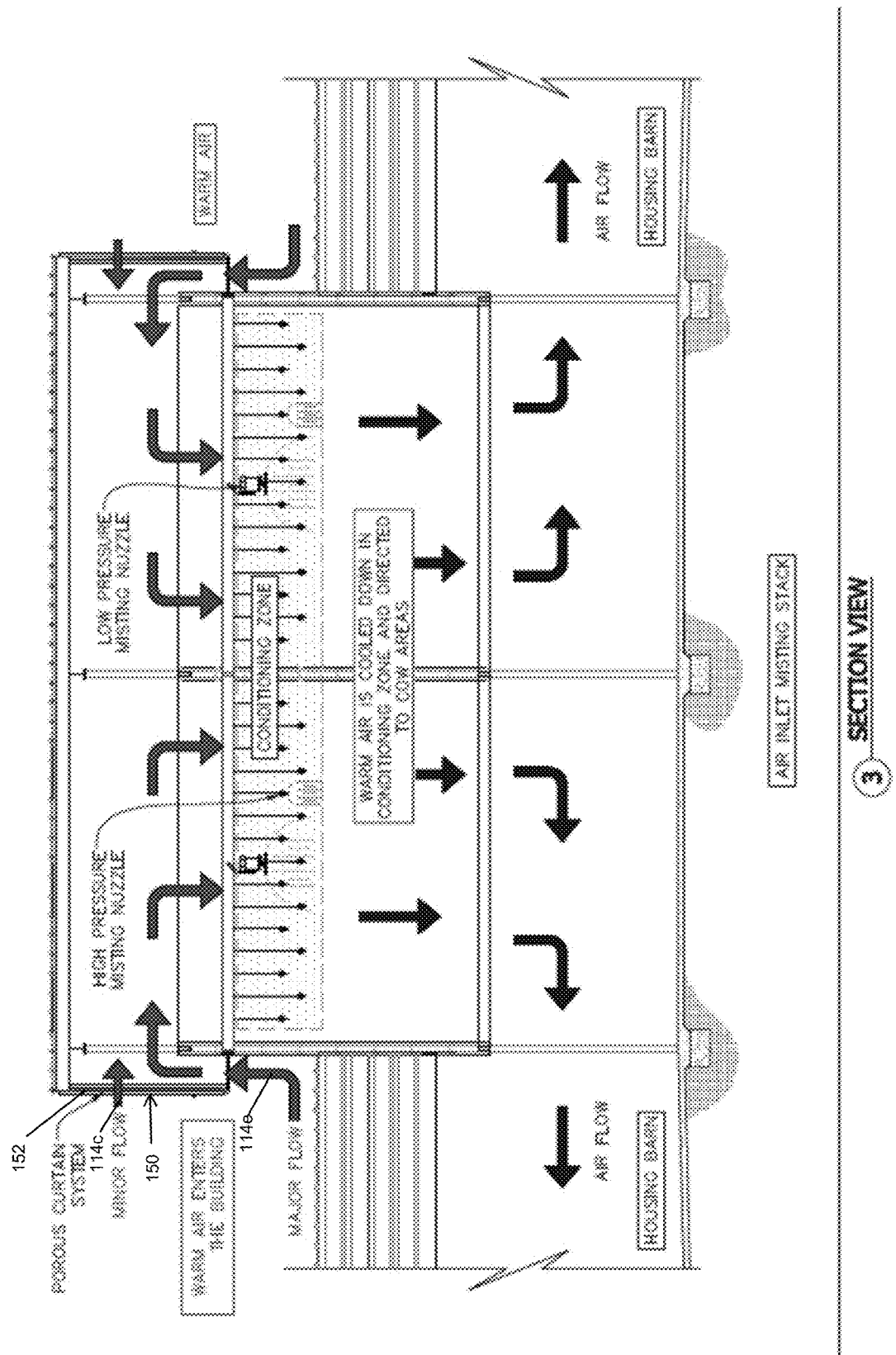
FIG. 15 is another section view of the misting stack end of the barn. Arrows indicate the direction of airflow. This figure shows the misting nozzles in greater detail.

FIGS. 14 and 15 are section views of the misting stack end of the barn which show misting nozzles 184, 186 in greater detail. Arrows 114e and 148 indicate the direction of airflow. Different misting nozzles 184, 186 may be located at different heights. In some examples, the height of the misting nozzle may correspond to which zone it belongs to. In some examples, misting nozzles within a particular zone may be located at a variety of heights. In some examples, a range of heights of one zone may overlap with a range of heights of another zone. In some examples, the low pressure system, including low pressure lines 182 of zone 3 may be located above the other zones in order to prevent damage to the electric motors 192 that may be collocated at each low pressure misting unit 186. In some examples the high pressure nozzles 184 of zones 1 and 2 may be distributed in at least two vertical locations, alternating across the width of a conditioning zone of the misting stack. Distributing the high pressure nozzles in at least two vertical locations may ensure that there is enough room around each nozzle for water particles to atomize and not collide with other particles.

As seen in FIG. 15, curtain 152 covering horizontal air inlets 150 of misting stack 126 may be porous. In some examples, a porous curtain system may allow for a minor flow of air into the misting stack from a horizontal direction while still, for example, blocking external precipitation. The minor flow 114c of air may be in addition to the major flow 114e of air which enters unobstructed vertical air inlets 146. The major air flow may travel vertically upwards before entering the misting stack.

Figure 16:
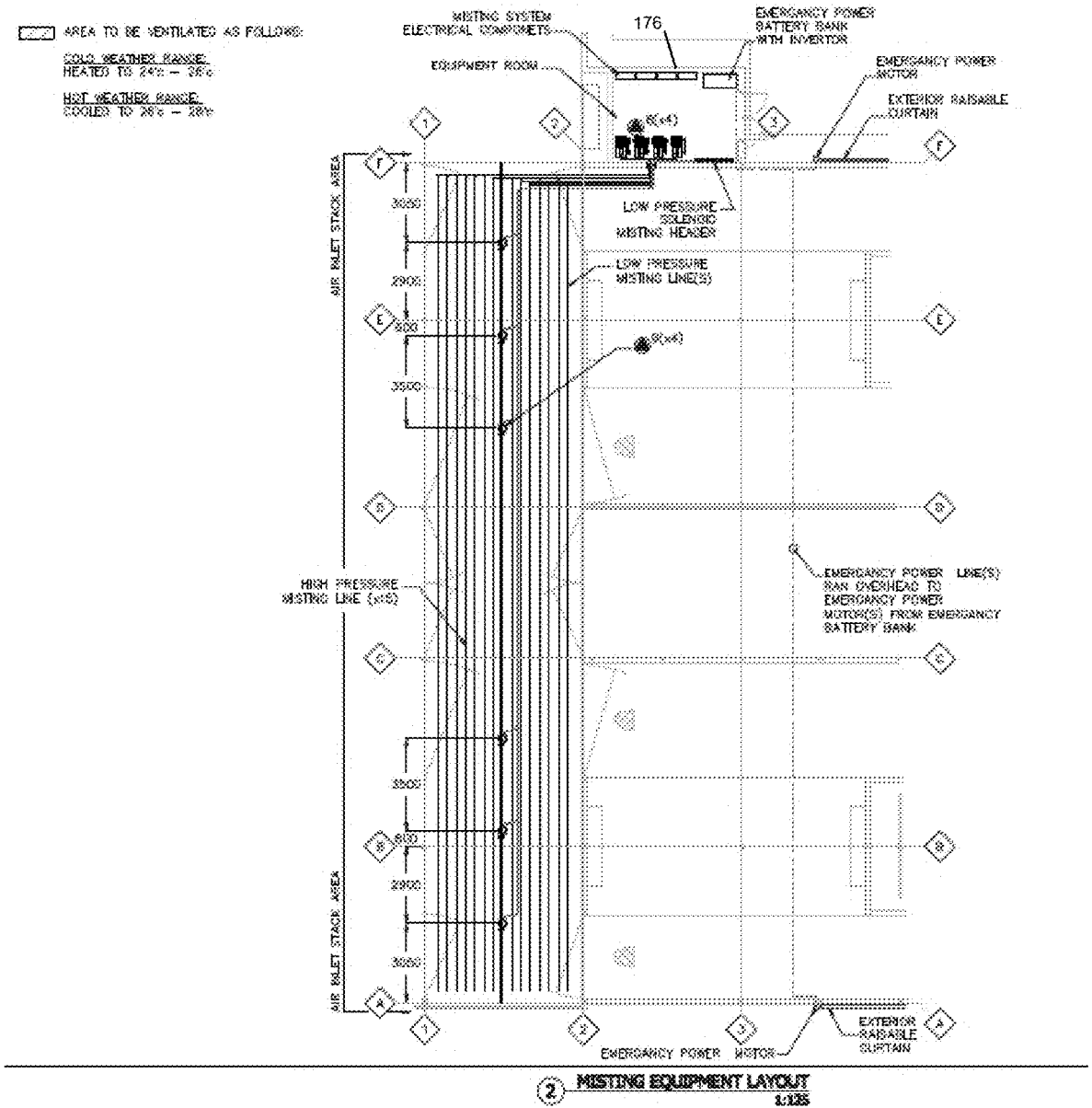
FIG. 16 is a plan view of the misting stack end of the barn and shows the layout of the misting equipment.

FIG. 16 is a plan view of the misting stack end of the barn and shows the layout of the misting equipment. The misting equipment room 176 is shown and, in some examples, may contain electrical components and an emergency power battery bank.

Figure 17:
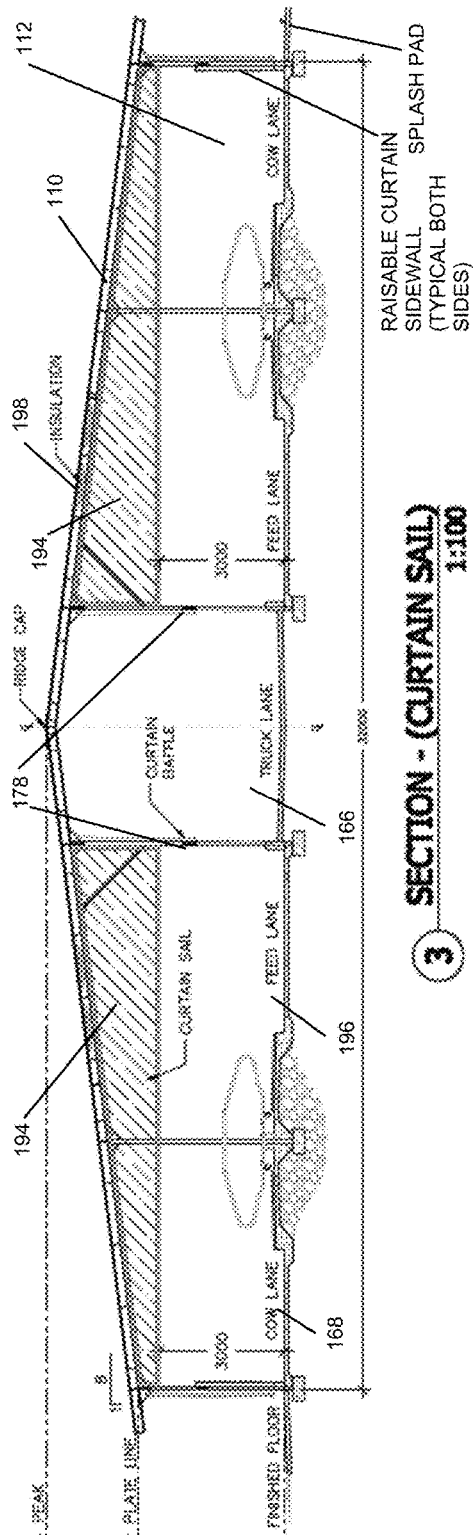
FIG. 17 is a section view of the barn that shows the curtain sail.
Figure 18:
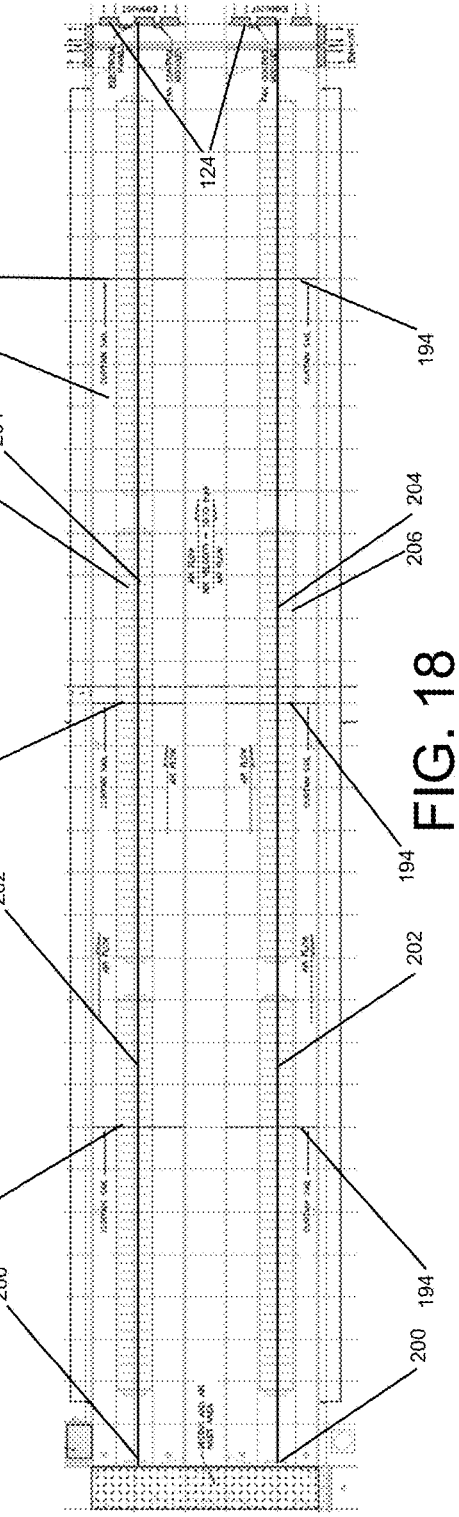
FIG. 18 is a plan view of a barn for holding cows in accordance with aspects of the present disclosure.

FIG. 17 is a section view of barn S that, along with FIG. 18, shows a set of sails, such as six curtain sails 194, which are deployed below roof 110 above region 112 for the livestock, which sails may be operable to disrupt laminar airflow, create turbulence, and to direct airflow 114 toward the livestock. Sails 194 typically extend transverse to airflow 114. In some examples, a plurality of curtain sails may be used to reduce air flow near the roof where air flow is unnecessary and to increase the air flow closer to the ground where the cows are located and, thus, where high air flow is needed. In some examples, the total cross sectional area of the barn is approximately 110 square meters. In some examples, curtain sails 194 installed along the barn to force airflow closer to cows may reduce the cross sectional area at the locations of the sails to approximately 80 square meters.

FIG. 18 is a plan view of a barn for holding cows in accordance with aspects of the present disclosure. This embodiment of the barn includes two cow lanes 168, two feed lanes 196, and a truck lane 166. In some examples, a barn according to the present teachings may include any suitable number of cow lanes, feed lanes, and/or truck lanes. System 100 may include insulation 198 installed in roof 110 of structure S, e.g., in pieces between beams or rafters of roof 110, which may help to minimize radiant heat gain.

FIG. 18 also shows a cow soaking system 200 that includes two cow soaker lines 202. The cow soaking system may be configured to operate at a low water pressure. For example, the cow soaking system may operate at any suitable pressure depending on the application and characteristics of the system. In some examples, the cow soaking system may operate at approximately 2.5 to 3 bar. In some examples, the cow soaking system may be controlled by the same control system which controls the high and low pressure misting systems. The cow soaking system may include soaker nozzle assemblies 204. The soaker nozzle assemblies may be configured to provide large water droplets which may penetrate the hair on the livestock. This may facilitate proper cooling of the livestock. Additionally, or alternatively, the soaker nozzle assemblies may include check valves to prevent draining of a main soaker line. The soaker nozzle assemblies may be positioned in any suitable location depending on the application and the characteristics of the barn. For example, the soaker nozzle assemblies may be mounted above cow headlocks 206 in a feed lane area. In some examples, the soaker nozzle assemblies may be mounted on a rigid supply line 202. In some examples, the rigid supply line may include PVC or HDPE piping. The soaker nozzle assemblies may be positioned at any suitable spacing depending on the application and the characteristics of the barn.

Figure 19:
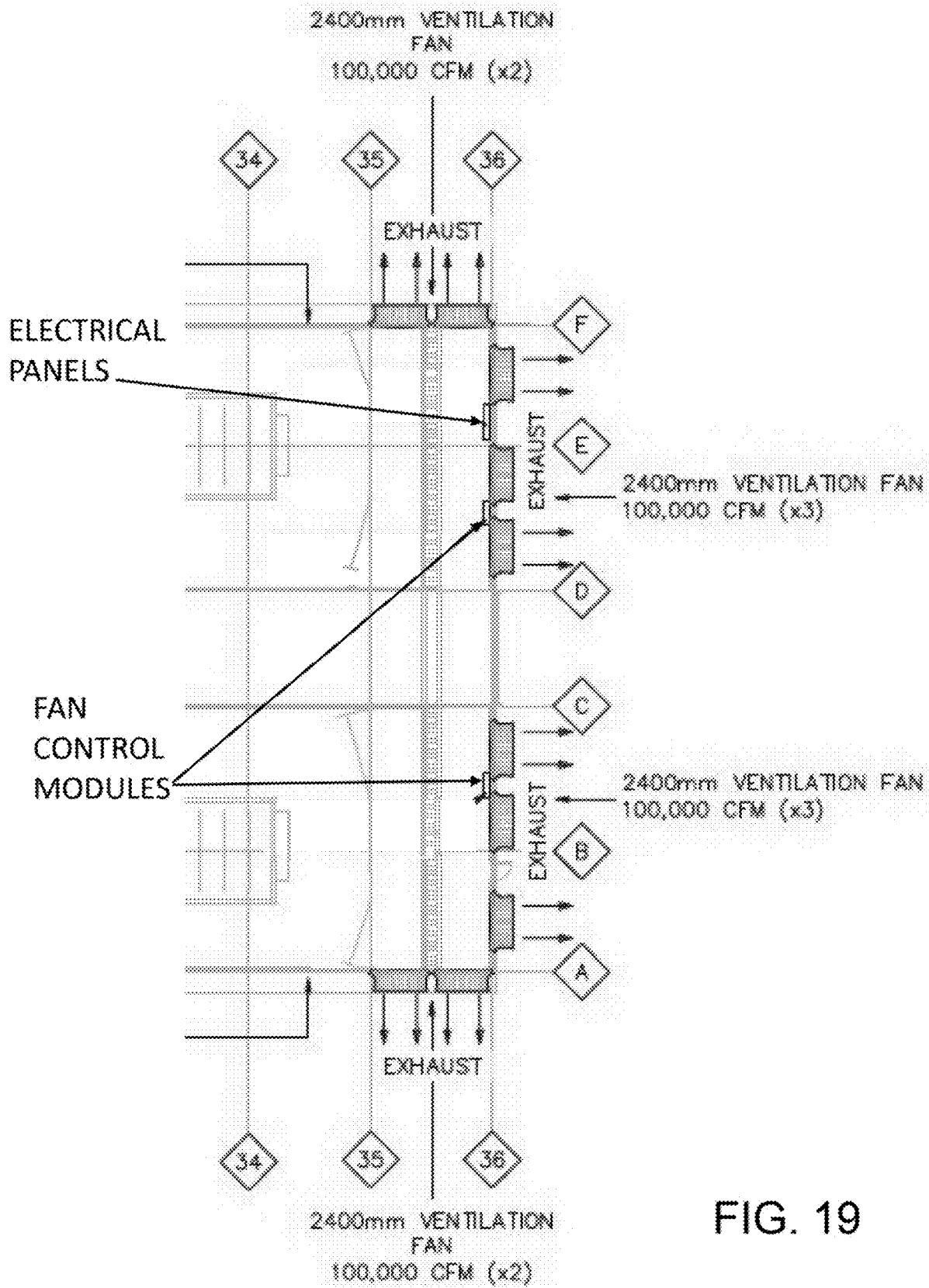
FIG. 19 is a magnification of a portion of FIG. 18 that shows the exhaust fan end of the barn.

FIG. 19 is a magnification of a portion of FIG. 18 that shows the exhaust fan end 104 of the barn. FIG. 19 shows the electrical panels located at the exhaust fan end of the barn, as well as fan control modules.

Figure 20:
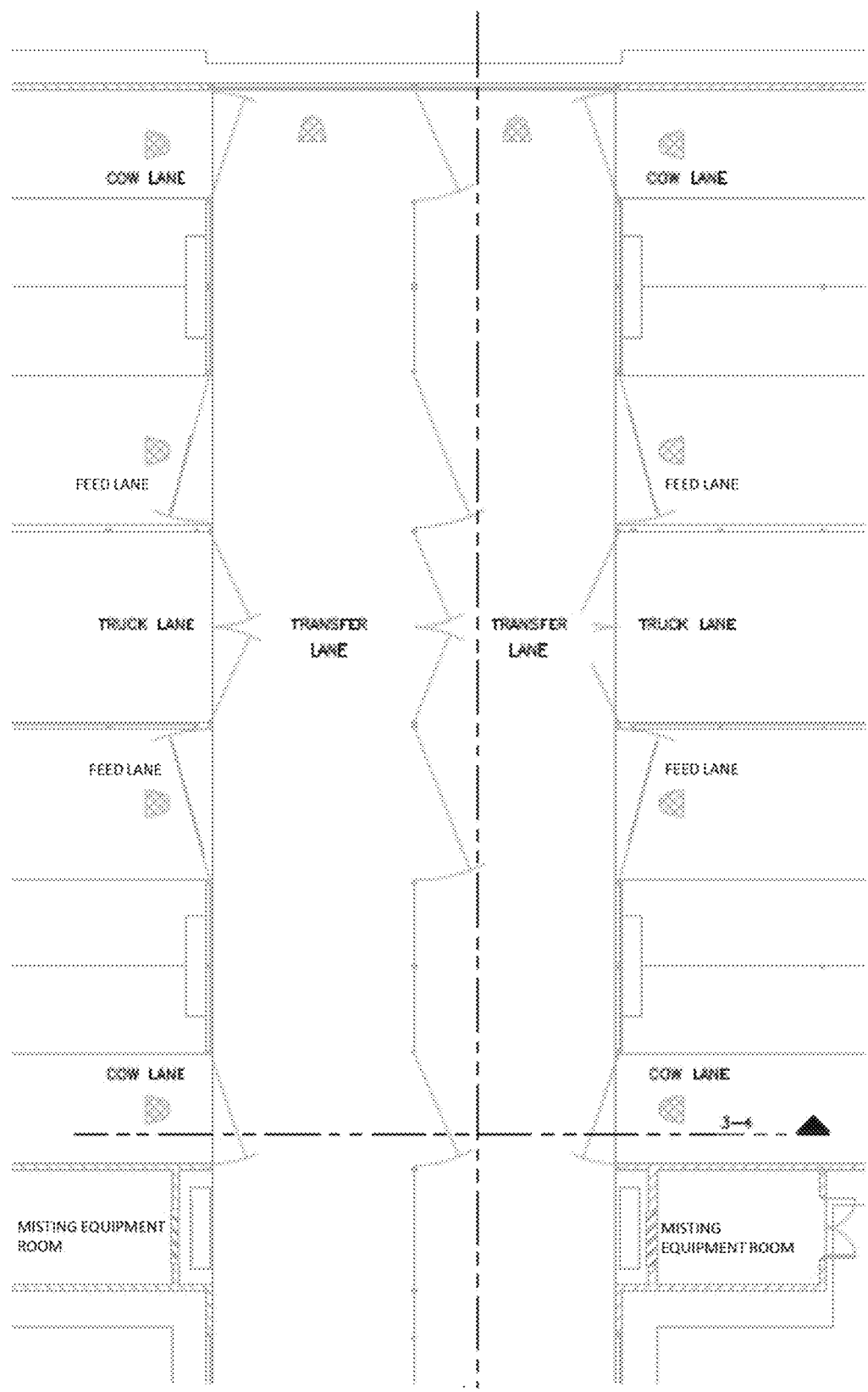
FIG. 20 is a plan view of another barn for holding cows in accordance with aspects of the present disclosure.

FIG. 20 is another plan view of the barn. In the embodiment shown in FIG. 20, the barn includes two central transfer lanes for transferring cows between regions of the barn. There are also four cow lanes and, opposite each cow lane is a feed lane. Between adjacent feed lanes, FIG. 20 shows truck lanes for feed trucks to deliver feed to the feed lanes. FIG. 20 also shows two misting equipment rooms. In other embodiments, a barn for holding livestock may include any suitable number of cow lanes, feed lanes, truck lanes, and/or equipment rooms.

Figure 21:
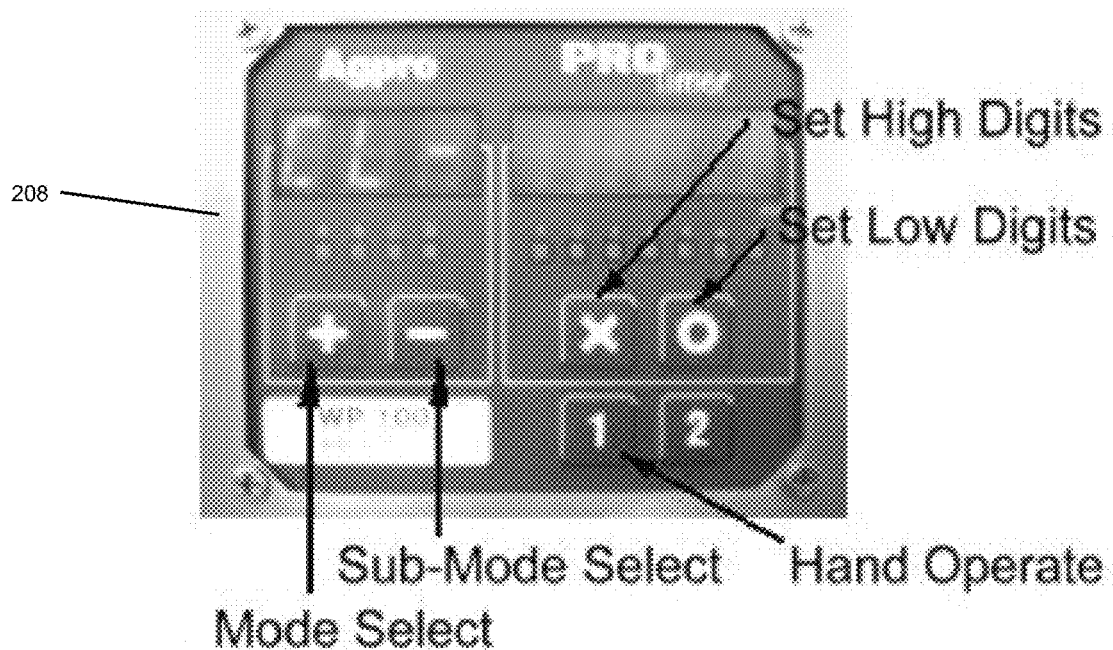
FIG. 21 depicts an interface for an illustrative control system suitable for use with the improved cooling system of the present disclosure.

FIG. 21 depicts an interface for an illustrative control system 208 suitable for use with the improved cooling system 100 of the present disclosure. In some examples, the cooling system may include three controllers: one to control the mist pumps (the pumps for the high and low pressure mist nozzles), one to control the soakers, and one to control the fans. In some examples, a single controller may be used in place of three separate controllers. Any suitable controllers configured to control the cooling system may be used. In some examples, a suitable controller may include an Agpro Pro Timer Model MC800. A suitable controller may include at least one sensor pod. In some examples, the controller may include up to 6 sensor pods. Each sensor pod may measure one or more of temperature, humidity, barometric pressure, wind speed, and/or any other suitable aspect of the environment. Any suitable sensor configured to measure one or more value and communicate the value to the controller may be used.

Control system 208 may be coupled to soaker nozzle assembly 200 and operable to cycle soaker nozzle assembly 200 through on times and off times, for example, an on time in a range from at least about 1 minute to no more than about 3 minutes and an off time in a range from at least about 10 minutes to no more than about 15 minutes. Control system 208 may also be coupled to evaporation zone 116 and exhaust fans 122 and may be operable to adjust evaporation zone 116 and the exhaust fan 122 for a desired air exchange within region 112 for the livestock in the structure, for example to completely exchange the air in region 112 within about 45 seconds.

Figure 22:
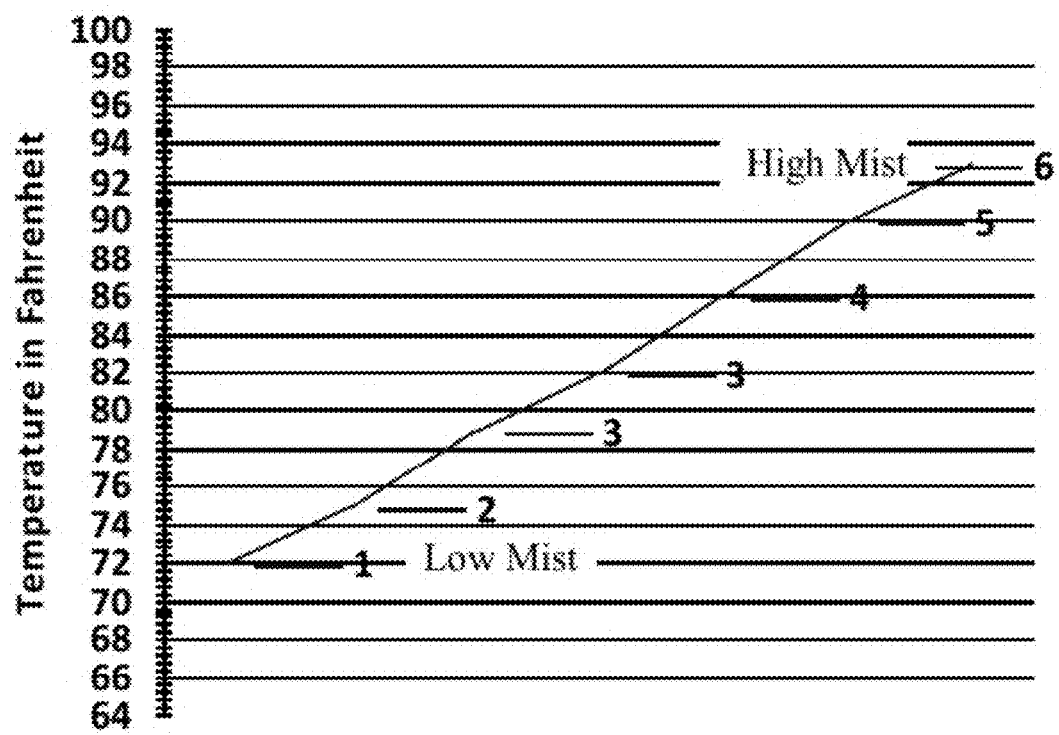
FIG. 22 depicts an illustrative example of the number of stages turned on by the controller given a particular measured temperature.
Figure 23:
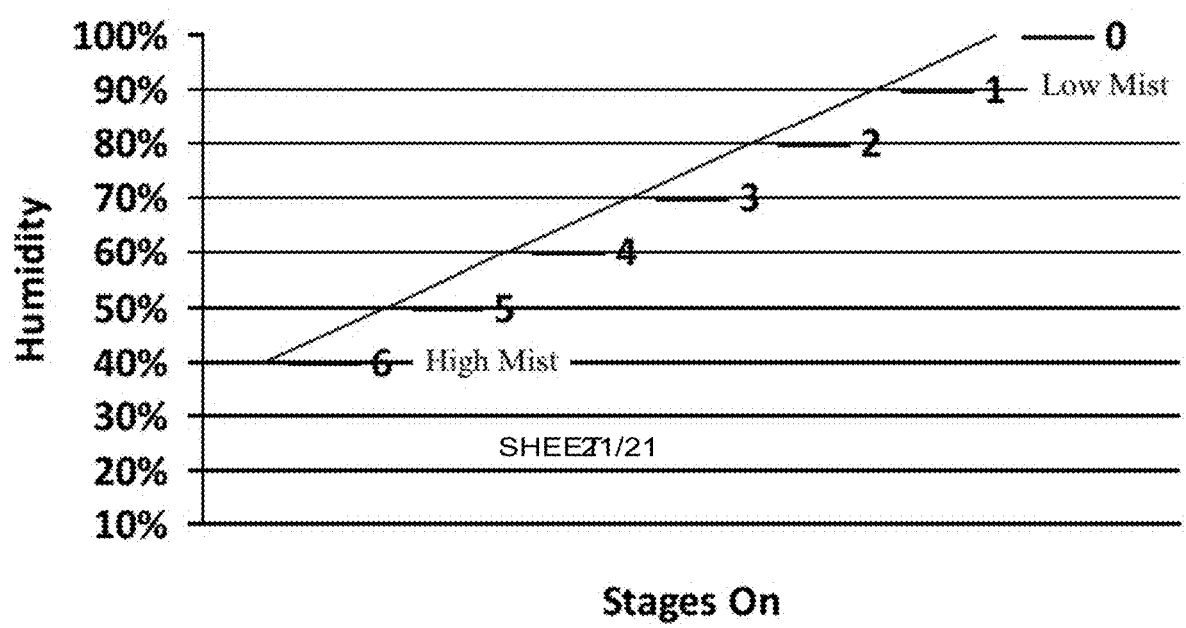
FIG. 23 depicts an illustrative example of the number of stages turned on by the controller given a particular measured humidity.

FIG. 22 depicts an illustrative example of the number of stages, from one to six, turned on by the controller given a particular measured temperature. FIG. 23 depicts an illustrative example of the number of stages, from zero to six, turned on by the controller given a particular measured humidity. In some examples, the controller may determine the number of and which stages and/or zones are turned on based on one or more of temperature, humidity, barometric pressure, wind speed, and/or any other suitable measurement. In some examples, which measurement or measurements are used by the controller and/or how much weight is given to each measurement may be user defined. For example, in some examples, it may be more important to control the cooling system based on the humidity of the ambient air while, in some examples, it may be more important to control the cooling system based on the temperature of the ambient air.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. To the extent that section headings are used within this disclosure, such headings are for organizational purposes only, and do not constitute a characterization of any claimed invention. Each example defines an embodiment disclosed in the foregoing disclosure, but any one example does not necessarily encompass all features or combinations that may be eventually claimed. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

We claim:

1. An evaporative cooling system for installation to a structure configured to hold livestock, wherein the structure includes a first end, a second end opposite the first end, and two sides opposite one another, the two sides extending between the first end and the second end, the structure further including a roof above the ends and sides, and wherein the ends, sides, and roof include therewithin at least one region for the livestock, the system configured to provide an airflow to the structure, the system comprising:
   a. at least one evaporation zone configured to be positioned adjacent the first end of the structure, the evaporation zone including a wall configured to separate in part the evaporation zone from the first end of the structure, the evaporation zone further including an opening adjacent the wall, the opening configured to allow the airflow to pass from the evaporation zone into the region for livestock in the structure;
   b. at least one exhaust fan configured to be positioned adjacent the second end of the structure with an inlet side facing the region for the livestock, the exhaust fan further configured to draw the airflow through the structure to the inlet side and out through the exhaust fan;
   c. a chamber formed in part by the wall configured to separate in part the evaporation zone from the first end of the structure, and a misting stack in the chamber, further wherein the evaporation zone is in the misting stack, and wherein the chamber includes a roof and a plurality of air inlets, wherein at least one of the air inlets is adjacent the roof; and
   d. at least one inlet divider baffle in the chamber adjacent one of the air inlets, the inlet divider baffle configurable to reduce the airflow through the adjacent air inlet.

2. The system of claim 1 wherein the system is configured to provide the airflow with a speed of at least about 550 feet per minute through the evaporation zone.

3. The system of claim 1 wherein the system is configured to provide the airflow with a speed of at least about 9 miles per hour through the region for the livestock.

4. The system of claim 1 wherein the system is configured to provide the airflow with a controlled speed in the range from about 9 miles per hour to about 11 miles per hour through the region for the livestock.

5. The system of claim 1 wherein the opening adjacent the wall is below the wall.

6. The system of claim 1 wherein the evaporation zone includes a high pressure misting zone and a low pressure misting zone.

7. The system of claim 6 wherein the high pressure misting zone and the low pressure misting zone are selectively operable to accommodate varying environmental conditions.

8. The system of claim 1 wherein the exhaust fan is operable to vary the airflow.

9. The system of claim 1 further including at least one curtain configured to be deployed along at least one side of the structure.

10. The system of claim 9 wherein the curtain is configured to be rolled up.

11. The system of claim 9 wherein the curtain is translucent.

12. The system of claim 1 further comprising at least one piece of insulation configured to be installed in the roof of the structure.

13. The system of claim 1 further comprising a plurality of exhaust fans and wherein at least one exhaust fan is located on the second end of the structure and at least one exhaust fan is located on one of the sides of the structure.

14. The system of claim 13 wherein at least one of the exhaust fans is located on the other side of the structure.

15. The system of claim 1 further comprising at least one soaker nozzle assembly configured to be located in the region for the livestock.

16. The system of claim 15 further comprising a control system coupled to the soaker nozzle assembly and operable to cycle the soaker nozzle assembly through on times and off times.

17. The system of claim 16 wherein each on time is at least about 1 minute and the off time is at least about 10 minutes.

18. The system of claim 1 further comprising a control system coupled to at least one of the evaporation zone and the exhaust fan.

19. The system of claim 18 wherein the control system is operable to adjust the evaporation zone and the exhaust fan for a desired air exchange within the region for the livestock in the structure.

20. The system of claim 19 wherein the airflow within the region for the livestock in the structure is sufficient to completely exchange the air within about 45 seconds.

21. An evaporative cooling system for installation to a structure configured to hold livestock, wherein the structure includes a first end, a second end opposite the first end, and two sides opposite one another, the two sides extending between the first end and the second end, the structure further including a roof above the ends and sides, and wherein the ends, sides, and roof include therewithin at least one region for the livestock, the system configured to provide an airflow to the structure, the system comprising:
   a. at least one evaporation zone configured to be positioned adjacent the first end of the structure, the evaporation zone including a wall configured to separate in part the evaporation zone from the first end of the structure, the evaporation zone further including an opening adjacent the wall, the opening configured to allow the airflow to pass from the evaporation zone into the region for livestock in the structure;
   b. at least one exhaust fan configured to be positioned adjacent the second end of the structure with an inlet side facing the region for the livestock, the exhaust fan further configured to draw the airflow through the structure to the inlet side and out through the exhaust fan; and
   c. a misting stack and wherein the evaporation zone is in the misting stack, wherein the misting stack defines a height and further wherein the height is selected for the system to provide for an air retention time of about 2.5 seconds.

22. An evaporative cooling system for installation to a structure configured to hold livestock, wherein the structure includes a first end, a second end opposite the first end, and two sides opposite one another, the two sides extending between the first end and the second end, the structure further including a roof above the ends and sides, and wherein the ends, sides, and roof include therewithin at least one region for the livestock and at least one region not for the livestock, the system configured to provide an airflow to the structure, the system comprising:
   a. at least one evaporation zone configured to be positioned adjacent the first end of the structure, the evaporation zone including a wall configured to separate in part the evaporation zone from the first end of the structure, the evaporation zone further including an opening adjacent the wall, the opening configured to allow the airflow to pass from the evaporation zone into the region for livestock in the structure;
   b. at least one exhaust fan configured to be positioned adjacent the second end of the structure with an inlet side facing the region for the livestock, the exhaust fan further configured to draw the airflow through the structure to the inlet side and out through the exhaust fan, wherein the system further includes at least one baffle to redirect the airflow away from the region not for the livestock.

23. The system of claim 22 further comprising a misting stack and wherein the evaporation zone is in the misting stack.

24. The system of claim 23 wherein the misting stack is in a chamber formed in part by the wall configured to separate in part the evaporation zone from the first end of the structure.

25. The system of claim 24 wherein the chamber is formed by three walls in addition to the wall configured to separate in part the evaporation zone from the first end of the structure.

26. The system of claim 24 wherein the chamber includes a roof.

27. The system of claim 26 wherein the chamber includes at least one air inlet adjacent the roof.

28. The system of claim 27 wherein the chamber includes a plurality of air inlets.

29. The system of claim 28 further comprising at least one inlet divider baffle in the chamber adjacent one of the air inlets, the inlet divider baffle configurable to reduce the airflow through the adjacent air inlet.

30. The system of claim 24 wherein the chamber includes at least one air inlet and the system is configured to provide the airflow with a speed of at least about 1500 feet per minute through the at least one air inlet.

31. The system of claim 24 wherein the chamber provides for the airflow to include a portion passing downward through the evaporation zone toward the opening adjacent the wall.

32. An evaporative cooling system for installation to a structure configured to hold livestock, wherein the structure includes a first end, a second end opposite the first end, and two sides opposite one another, the two sides extending between the first end and the second end, the structure further including a roof above the ends and sides, and wherein the ends, sides, and roof include therewithin at least one region for the livestock, the system configured to provide an airflow to the structure, the system comprising:

a. at least one evaporation zone configured to be positioned adjacent the first end of the structure, the evaporation zone including a wall configured to separate in part the evaporation zone from the first end of the structure, the evaporation zone further including an opening adjacent the wall, the opening configured to allow the airflow to pass from the evaporation zone into the region for livestock in the structure;
b. at least one exhaust fan configured to be positioned adjacent the second end of the structure with an inlet side facing the region for the livestock, the exhaust fan further configured to draw the airflow through the structure to the inlet side and out through the exhaust fan; and
c. at least one sail configured to be deployed in the region for the livestock and operable to direct the airflow toward the livestock.

33. An evaporative cooling system for installation to a structure configured to hold livestock, wherein the structure includes a first end, a second end opposite the first end, and two sides opposite one another, the two sides extending between the first end and the second end, the structure further including a roof above the ends and sides, and wherein the ends, sides, and roof include therewithin at least one region for the livestock, the system configured to provide an airflow to the structure, the system comprising:

a. at least one evaporation zone configured to be positioned adjacent the first end of the structure, the evaporation zone including a wall configured to separate in part the evaporation zone from the first end of the structure, the evaporation zone further including an opening adjacent the wall, the opening configured to allow the airflow to pass from the evaporation zone into the region for livestock in the structure;
b. at least one exhaust fan configured to be positioned adjacent the second end of the structure with an inlet side facing the region for the livestock, the exhaust fan further configured to draw the airflow through the structure to the inlet side and out through the exhaust fan; and
c. at least one soaker nozzle assembly configured to be located in the region for the livestock; and
d. a control system coupled to the soaker nozzle assembly and operable to cycle the soaker nozzle assembly through on times and off times, wherein each on time is in a range from at least about 1 minute to no more than about 3 minutes and the off time is in a range from at least about 10 minutes to no more than about 15 minutes.

* * * * *